US012793328B2

(12) United States Patent
Kumar et al.

(10) Patent No.: US 12,793,328 B2
(45) Date of Patent: Nov. 10, 2026

(54) METHOD AND SYSTEM FOR PERFORMING THREE-DIMENSIONAL (3D)-AWARE IMAGE EDITING

(71) Applicant: MOHAMED BIN ZAYED UNIVERSITY OF ARTIFICIAL INTELLIGENCE, Abu Dhabi (AE)

(72) Inventors: Amandeep Kumar, Abu Dhabi (AE); Muhammad Awais, Abu Dhabi (AE); Hisham Cholakkal, Abu Dhabi (AE); Salman Khan, Abu Dhabi (AE); Rao Muhammad Anwer, Abu Dhabi (AE)

(73) Assignee: MOHAMED BIN ZAYED UNIVERSITY OF ARTIFICIAL INTELLIGENCE, Abu Dhabi (AE)

( * ) Notice: Subject to any disclaimer, the term of this patent is extended or adjusted under 35 U.S.C. 154(b) by 0 days.

(21) Appl. No.: 19/460,468

(22) Filed: Jan. 27, 2026

(65) Prior Publication Data

US 2026/0253316 A1 Aug. 27, 2026

Related U.S. Application Data

(63) Continuation of application No. 19/065,624, filed on Feb. 27, 2025.

(51) Int. Cl.
*G06T 15/20* (2011.01)
*G06T 15/04* (2011.01)

(52) U.S. Cl.
CPC .............. *G06T 15/20* (2013.01); *G06T 15/04* (2013.01)

(58) Field of Classification Search
CPC ................................ G06T 15/20; G06T 15/04
See application file for complete search history.

(56) References Cited

U.S. PATENT DOCUMENTS 11,941,727 B2 * 3/2024 Motiian .................. G06T 11/00
2019/0355155 A1 * 11/2019 Shugrina ................ G06T 11/10
(Continued)

FOREIGN PATENT DOCUMENTS

CN 113542758 B 9/2024
CN 118608902 A 9/2024
WO WO-2025183385 A1 * 9/2025 ............ G06T 11/00

OTHER PUBLICATIONS

37. Zhao et al., Generative Multiplane Images: Making a 2D GAN 3D-Aware, 17th European Conference, Tel Aviv, Israel, Oct. 23-27, 2022 Proceedings, Part V. (Year: 2022).*
(Continued)

*Primary Examiner* — Devona E Faulk
*Assistant Examiner* — Donna J. Ricks
(74) *Attorney, Agent, or Firm* — Oblon, McClelland, Maier & Neustadt, L.L.P.

(57) ABSTRACT

A method and a system for performing image editing based on an attribute-specific text prompt includes acquiring a noise code (z), a textual instruction ($A^i$) specifying a target facial attribute to be edited, and a target camera pose ($p_t$). Upon acquiring, mapping the noise code (z) to a latent code (w), via a mapping network. Once the mapping is done, editing the latent code (w) based on the textual instruction ($A^i$) to generate an edited latent code ($\hat{w}$), via a text-driven Latent Attribute Editor (LAE). Further, based on the edited latent code ($\hat{w}$), generating a color texture image and a set of alpha maps via a three-dimensional Generative Adversarial Network (3D GAN). Furthermore, based on the color texture image and the set of alpha maps, generating a 3D-aware and view-consistent image at the target camera pose ($p_t$) via a differentiable renderer.

16 Claims, 11 Drawing Sheets

(56) References Cited

U.S. PATENT DOCUMENTS

| | | | | |
|---|---|---|---|---|
| 2023/0252692 | A1* | 8/2023 | Liu | G06T 11/10 345/582 |
| 2024/0361891 | A1* | 10/2024 | Bagnall | G06F 3/04845 |
| 2024/0404013 | A1* | 12/2024 | Zhou | G06T 5/50 |
| 2025/0225683 | A1* | 7/2025 | Tanjim | G06T 11/00 |
| 2026/0011056 | A1* | 1/2026 | Zhi | G06T 11/60 |

OTHER PUBLICATIONS

Zeng et al. “Improving visual quality of image synthesis by a token-based generator with transformers.” Advances in Neural Information Processing Systems 34 (2021): 21125-21137. (Year: 2021).*

WO 2023/179075 A1 (Year: 2023).*

Yuanze Lin, et al., “Text-Driven Image Editing via Learnable Regions”, IEEE/CVF Conference on Computer Vision and Pattern Recognition (CVPR), 2024, pp. 7059-7068.

Moab Arar, et al., “PALP: Prompt Aligned Personalization of Text-to-Image Models”, arXiv:2401.06105v1 [cs.CV], Jan. 11, 2024, 19 pages.

* cited by examiner

METHOD AND SYSTEM FOR PERFORMING THREE-DIMENSIONAL (3D)-AWARE IMAGE EDITING

CROSS REFERENCE TO RELATED APPLICATIONS

This application is a continuation of and claims benefit under 35 U.S.C. § 120 to U.S. application Ser. No. 19/065,624, filed Feb. 27, 2025, the entire contents of each of which are incorporated herein by reference.

STATEMENT REGARDING PRIOR DISCLOSURE BY THE INVENTORS

Aspects of this technology are described in an article by Amandeep Kumar, Muhammad Awais, Sanath Narayan, Hisham Cholakkal, Salman Khan, and Rao Muhammad Anwer, "Efficient 3D-Aware Facial Image Editing via Attribute-Specific Prompt Learning," submitted to arXiv on Jun. 6, 2024, a document by Amandeep Kumar, Muhammad Awais, Sanath Narayan, Hisham Cholakkal, Salman Khan, and Rao Muhammad Anwer, "Efficient-3D-Aware-Facial-Image-Editing", submitted to GitHub in July 2024, and an article by Amandeep Kumar, Muhammad Awais, Sanath Narayan, Hisham Cholakkal, Salman Khan, and Rao Muhammad Anwer, "Efficient 3D-Aware Facial Image Editing via Attribute-Specific Prompt Learning," 2024 18th European Conference on Computer Vision (ECCV 2024), MiCo Milano, Italy, Sep. 29 to Oct. 4, 2024. All these publications are herein incorporated by reference in their entirety.

BACKGROUND

Technical Field

The present disclosure is directed to image editing, and more particularly to a method and a system for performing image editing based on an attribute-specific text prompt.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent advancements in generative models, particularly in the domain of image synthesis, have led to remarkable developments in both two-dimensional image generation (2D) and three-dimensional (3D) image generation. In the 2D domain, models like a Style Generative Adversarial Network (GAN) have demonstrated exceptional capabilities in generating high-quality, photorealistic 2D images. The StyleGAN model leverages a learned latent space with disentangled properties, enabling semantic editing of images by identifying and modifying attribute-specific directions in the latent space. The ability to manipulate and adjust various visual attributes, such as facial features, lighting, and background, with fine-grained control has opened up numerous applications in areas such as image synthesis, style transfer, and content creation.

Building on these advancements, recent studies have utilized foundational vision-language models like a Contrastive Language-Image Pre-training (CLIP) to guide the manipulation of these attributes via textual descriptions, further expanding the scope of editable features. This integration of language-based control allows users to interact with the generative models more intuitively and flexibly, enabling a broader range of image transformations without the need for manually specifying latent directions.

The success of the StyleGAN has not been limited to 2D image generation. Efforts to extend the StyleGAN capabilities to 3D-aware image generation have led to the development of novel approaches that aim to create view-consistent images. Models like Generative Multiplane Images (GMPI), for instance, introduce an alpha branch to learn alpha maps, enabling efficient 3D-aware multiplane image generation. Other works, such as a Style-based Neural Radiance Field (NeRF) and an Explicitly Gated 3D (EG3D), have integrated NeRFs and triplane representations into the style-based generator, allowing for view-consistent image synthesis across different perspectives. These innovations have paved the way for creating more dynamic, realistic, and interactive 3D content.

However, these existing methods of 3D-aware image editing introduce a set of unique challenges that are not as prevalent in 2D image generation. In addition to ensuring consistency between edited and original images, maintaining view consistency across varying camera angles is critical, especially in facial identity preservation tasks. Moreover, achieving high-quality 3D image manipulation that retains realism and identity while allowing flexible editing is a difficult problem that requires careful balancing of numerous factors, including pose variation and lighting conditions.

Furthermore, the existing methods that allow for attribute-specific editing in 3D space often have significant limitations. This is because the existing methods typically rely on pre-trained attribute classifiers, which must be retrained for each new attribute that the generative model is trained to manipulate. In other words, the retraining process for the generative model can be time-consuming when performed using large datasets with multiple new attributes, as in the retraining process, the pre-trained attribute classifiers need to be retrained for each new attribute present in these large datasets. Moreover, these existing methods struggle with maintaining identity consistency and view consistency, particularly when manipulating a wide range of attributes across different camera angles. As a result, while the editing of 3D attributes is possible, it is often constrained by the need for predefined classifiers, limiting the range of feasible edits and making novel attribute manipulation difficult, expensive, and resource-intensive.

SUMMARY

In an exemplary embodiment, a system for performing image editing based on an attribute-specific text prompt is described. The system includes a mapping network, a text-driven Latent Attribute Editor (LAE), a three-dimensional Generative Adversarial Network (3D GAN), and a differentiable renderer. The mapping network is configured to acquire a noise code (z) and map the noise code (z) to a latent code (w). The text-driven LAE is configured to acquire a textual instruction ($A^i$) specifying a target facial attribute to be edited, and edit the latent code (w) based on the textual instruction ($A^i$) to generate an edited latent code (w). The 3D GAN is configured to generate a color texture image and a set of alpha maps, based on the edited latent code ($\hat{w}$). The differentiable renderer is configured to acquire a target camera pose ($p_t$), and generate a 3D-aware and view-consistent image at the target camera pose ($p_t$), based on the color texture image and the set of alpha maps.

In another exemplary embodiment, a method for performing image editing based on an attribute-specific text prompt is described. The method includes acquiring a noise code (z), a textual instruction ($A^i$) specifying a target facial attribute to be edited, and a target camera pose ($p_t$). The method includes mapping the noise code (z) to a latent code (w), via a mapping network. The method includes editing the latent code (w) based on the textual instruction ($A^i$) to generate an edited latent code ($\hat{w}$), via a text-driven Latent Attribute Editor (LAE). The method includes generating a color texture image and a set of alpha maps, based on the edited latent code (w), via a three-dimensional Generative Adversarial Network (3D GAN). The method includes generating a 3D-aware and view-consistent image at the target camera pose ($p_t$), based on the color texture image and the set of alpha maps, via a differentiable renderer.

In yet another exemplary embodiment, a non-transitory computer readable medium having instructions stored therein that, when executed by one or more processor, cause the one or more processors to perform a method for performing image editing based on an attribute-specific text prompt is described. The method includes acquiring a noise code (z), a textual instruction ($A^i$) specifying a target facial attribute to be edited, and a target camera pose ($p_t$). The method includes mapping the noise code (z) to a latent code (w), via a mapping network. The method includes editing the latent code (w) based on the textual instruction ($A^i$) to generate an edited latent code ($\hat{w}$), via a text-driven Latent Attribute Editor (LAE). The method includes generating a color texture image and a set of alpha maps, based on the edited latent code ($\hat{w}$), via a three-dimensional Generative Adversarial Network (3D GAN). The method includes generating a 3D-aware and view-consistent image at the target camera pose ($p_t$), based on the color texture image and the set of alpha maps, via a differentiable renderer.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
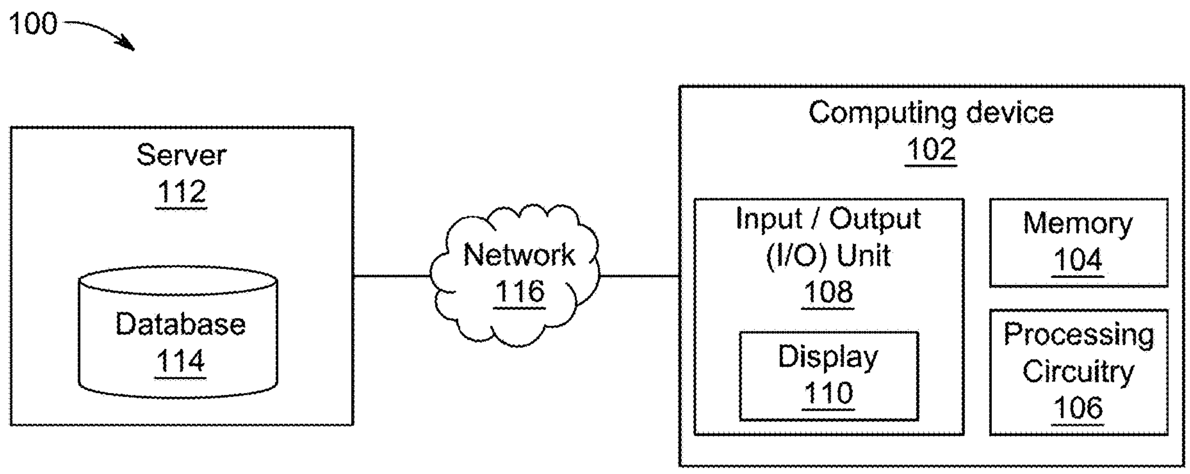
FIG. 1 is an exemplary diagram of a system configured for performing image editing based on an attribute-specific text prompt, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of this disclosure are directed to a system and a method for performing image editing based on an attribute-specific text prompt. To perform the image editing, the method includes acquiring a noise code (z), a textual instruction ($A^i$) specifying a target facial attribute to be edited, and a target camera pose ($p_t$). Upon acquiring, mapping the noise code (z) to a latent code (w), via a mapping network. Once the mapping of the noise code with the latent code is done, editing the latent code (w) based on the textual instruction ($A^i$) to generate an edited latent code ($\hat{w}$), via a text-driven Latent Attribute Editor (LAE). Further, based on the edited latent code ($\hat{w}$), generating a single color texture image and a set of alpha maps via a three-dimensional Generative Adversarial Network (3D GAN). Furthermore, based on the color texture image and the set of alpha maps, generating a 3D-aware and view-consistent image at the target camera pose ($p_t$) via a differentiable renderer.

Referring now to FIG. 1, the present disclosure provides an exemplary diagram of a system 100 configured for performing image editing based on an attribute-specific text prompt, according to certain embodiments. In order to perform the image editing, the system 100 may include a computing device 102. In some embodiments, the system 100 may be the computing device 102. The computing device 102 is configured to perform the image editing based on the attribute-specific text prompt. Examples of the computing device 102 may include a desktop, a laptop, a tablet, a smartphone, and the like. In an embodiment, the attribute-specific text prompt is a textual instruction that focuses on particular characteristics or features of an image or an object (e.g., a human face) present in the image. To perform the image editing, initially, the computing device 102 is configured to acquire a noise code (z). In particular, a mapping network may be configured to acquire a noise code (z). The mapping network may correspond to a neural network. In an embodiment, the mapping network may be present within a memory 104 of the computing device 102. Examples of the mapping network may include, but are not limited to, a network pre-trained for obtaining a latent code from an input random latent vector, and the like. Once the noise code (z) is acquired, the mapping network is configured to map the noise code (z) to a latent code (w). In an embodiment, the noise code (z) is acquired from a random distribution (e.g., a Gaussian distribution or a uniform distribution). The noise code (z) is a random vector that serves as an input to a generative model. The generative model may correspond to a three-dimensional (3D) GAN. Further, the latent code (w) is a transformed version of the noise code (z) mapped into a more structured and meaningful space. In particular, the latent code (w) is a lower-dimensional representation that the 3D GAN uses for image generation and manipulation.

The computing device 102 further includes a text-driven Latent Attribute Editor (LAE). In particular, the text-driven LAE may reside within the memory 104 of the computing device 102. The text-driven LAE may be configured to acquire a textual instruction ($A^i$) specifying a target facial attribute to be edited. Examples of the textual instruction ($A^i$) specifying the target facial attribute to be edited may be, for example, include instructions such as 'make the smile wider,' 'change hair color,' 'change age,' and the like. In addition, the target facial attribute to be edited include, but is not limited to, an age, a makeup, a hair color, a hair style, a pupil color, a skin tone, and a facial emotional state. Further, based on the textual instruction ($A^i$), the text-driven LAE is configured to edit the latent code (w) to generate an edited latent code ($\hat{w}$). To generate the edited latent code ($\hat{w}$), the text-driven LAE includes a set of learnable style tokens ($V_i$). In an embodiment, each learnable style token corresponds to an editable facial attribute.

The text-driven LAE also includes a text encoder and a style mapper. The text encoder is configured to generate a textual embedding ($\Delta v$) representing a style corresponding to the target facial attribute based on the textual instruction (Ai). The text encoder is further configured to concatenate the textual instruction ($A^i$), the set of learnable style tokens ($V_i$), and a system prompt (t) to obtain a general prompt ($P^i_A$). Once the general prompt ($P^i_A$) is available, the text encoder is configured to encode the general prompt ($P^i_A$) to the textual embedding ($\Delta v$). In an embodiment, the text encoder is a Contrastive Language-Image Pretraining (CLIP) text encoder.

In an embodiment, the style mapper is configured to generate the edited latent code ($\hat{w}$) based on the textual embedding ($\Delta v$). The style mapper is further configured to map the textual embedding ($\Delta v$) to an editing direction ($\Delta w$) in a latent space of the 3D GAN. Based on the editing direction ($\Delta w$) and the latent code (w), the style mapper is also configured to generate the edited latent code ($\hat{w}$). The style mapper includes a linear mapper configured to apply linear mapping to transform the textual embedding ($\Delta v$) into the editing direction ($\Delta w$) in the latent space. In an embodiment, the latent code (w) is divided into three groups, i.e., a group with coarse features ($w_c$), a group with middle features ($w_m$), and a group with fine features ($w_f$), and the linear mapper includes three sub-networks used for the three groups, respectively.

Once the edited latent code ($\hat{w}$) is generated, the 3D GAN may be configured to generate a single color texture image and a set of alpha maps, based on the edited latent code ($\hat{w}$). The 3D GAN may be present within the memory 104 of the computing device 102. In an embodiment, the 3D GAN may correspond to a Generative Multiplane Image (GMPI) StyleGANversion2 with an alpha branch. In an embodiment, the color texture image is a two-dimensional (2D) image that represents a visual appearance of a 3D object (e.g., a human face) from a specific view or a camera angle. In particular, the color texture image is a 2D image representing surface colors (e.g., skin tone, eye color, hair color) of the 3D object (e.g., the human face). The surface colors are applied based on the edited latent code ($\hat{w}$). Further, the set of alpha maps are additional 2D images that store information about an opacity (i.e., transparency) of the 3D object (i.e., the human face) at different points. The set of alpha maps is crucial for ensuring that the 3D object is rendered correctly in a 3D-aware manner.

Once the color texture image and the set of alpha maps are generated, a differentiable renderer is configured to acquire a target camera pose ($p_t$). Once the target camera pose ($p_t$) is acquired, the differentiable renderer is configured to generate a 3D-aware and view-consistent image at the target camera pose ($p_t$), based on the color texture image and the set of alpha maps. The differentiable renderer may be present within the memory 104 of the computing device 102. In an embodiment, the differentiable renderer is configured to automatically compute the target camera pose ($p_t$) from data, like sensor readings, optimization, or 3D reconstruction. In some embodiments, the target camera pose ($p_t$) is manually provided by a user (a photographer, a graphics designer, a normal person, an illustrator, etc.). The target camera pose ($p_t$) refers to a specific position and an orientation of a camera (i.e., a camera associated with the computing device 102) in 3D space. The target camera pose ($p_t$) is used to determine a viewpoint (also referred to as a camera viewpoint) from which a scene is viewed or rendered. Further, the differentiable renderer generates the 3D-aware and view-consistent image at the target camera pose ($p_t$) based on the color texture image and the set of alpha maps. The 3D-aware and view-consistent image reflects a 3D structure (e.g., textures, geometry, lighting, depth) of the scene and is consistent with the way, the scene should appear from the target camera pose ($p_t$), taking perspective, occlusions, and transparency into account.

In an embodiment, the computing device 102 is trained based on a plurality of training images and additional metadata (like text prompts, 3D models, or labels) present within a database 114 of a server 112. The database 114 is periodically updated based on a new set of training images. In particular, the text-driven LAE within the memory 104 of the computing device 102 is trained based on the plurality of training images to perform the image editing. The computing device 102 is configured to receive the plurality of training images from the server 112 over a network 116. Examples of the server 112 may include, but are not limited to, a desktop, a laptop, a tablet, a smartphone, and the like. Examples of the network 116 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

In particular, in order to train the computing device 102 (particularly, the text-driven LAE), an end-to-end training is performed using a loss function. The loss function includes a text-prompt-based attribute editing loss term ($L_T$) and a 3D-aware identity and pose preservation term ($L_P$). In other words, the loss function is calculated for each training image of the plurality of training images received as an input during a training process to compare each training image with a generated image (e.g., the 3D-aware and view-consistent image) to enhance the accuracy of the text-driven LAE. The text-prompt-based attribute editing loss term ($L_T$) includes a directional CLIP loss term ($L_{Dclip}$) and a style token contrastive learning loss term ($L_{sc}$). Further, the 3D-aware identity and pose preservation term ($L_P$) includes an identity preservation loss term ($L_{id}$), an identity consistency preservation loss term ($L_{idvc}$), a camera pose preservation loss term ($L_{latent}$), and an alpha-map consistency preservation loss term ($L_\alpha$).

The directional CLIP loss term ($L_{Dclip}$) is used to measure a similarity between an image embedding (i.e., the textual embedding ($\Delta$v)) and a text prompt (i.e., the textual instruction ($A^i$)) using a CLIP (i.e., the CLIP text encoder), guiding the computing device 102 (i.e., the text-driven LAE) to modify an input image (e.g. an original image or a training image) based on the text prompt. The style token contrastive learning loss term ($L_{sc}$) encourages the text-driven LAE to maintain consistent style tokens by contrasting a learnable style token across different image generations, ensuring style consistency between the generated images and reference images (e.g., the input image). Further, the identity preservation loss term ($L_{id}$) ensures that an identity (e.g., a shape, a size, and distinctive features) of the object, i.e., the 3D object (e.g., the human face) remains unchanged after modification, preserving its original appearance. The identity consistency preservation loss term ($L_{idvc}$) maintains identity consistency across multiple views or iterations, ensuring the object (e.g., the human face) maintains the same identity even when viewed from different camera angles. The camera pose preservation loss term ($L_{latent}$) ensures that a camera pose (i.e., the camera viewpoint) of the object remains consistent after modifications, preserving a relative positioning of the object in the 3D space. The alpha-map consistency preservation loss term ($L_\alpha$) guarantees that an alpha map (which defines transparency) remains consistent, ensuring no unwanted changes appear in the object's transparency or occlusion during edits. This complete method of performing the image editing is further explained in detail in conjunction with FIG. 2 to FIG. 9.

The memory 104 may be a volatile memory, such as a Random-Access Memory (RAM), or a non-volatile memory such as a Read Only Memory (ROM), an Erasable Programmable Read Only Memory (EPROM), a flash memory, and the like. The memory 104 may be configured to store one or more computer-readable instructions or routines that when executed may cause the computing device 102 to perform the image editing based on the attribute-specific text prompt. The memory 104 may perform the image editing in conjunction with a processing circuitry 106. In other words, the processing circuitry 106 may be configured to execute the one or more computer-readable instructions stored within the memory 104 to perform the image editing based on the attribute-specific text prompt. The processing circuitry 106 may be implemented as one or more microprocessors, microcomputers, microcontrollers, Digital Signal Processors (DSPs), Central Processing Units (CPUs), logic circuitries, and/or any devices that process data based on operational instructions.

In an embodiment, the computing device 102 may also include an Input/Output (I/O) unit 108. The I/O unit 108 may be used by the user to provide inputs (such as an image to be edited, the textual instruction ($A^i$) specifying the target facial attribute, the plurality of training image, and the like) to the computing device 102. Further, the I/O unit 108 may include a display 110. The display may be used to display intermediatory results, e.g., the latent code (w), the color texture image, the set of alpha maps, etc., or a final result, e.g., the 3D-aware and view-consistent image based on processing performed by the computing device 102 for performing the image editing based on the attribute-specific text prompt.

Figure 2:
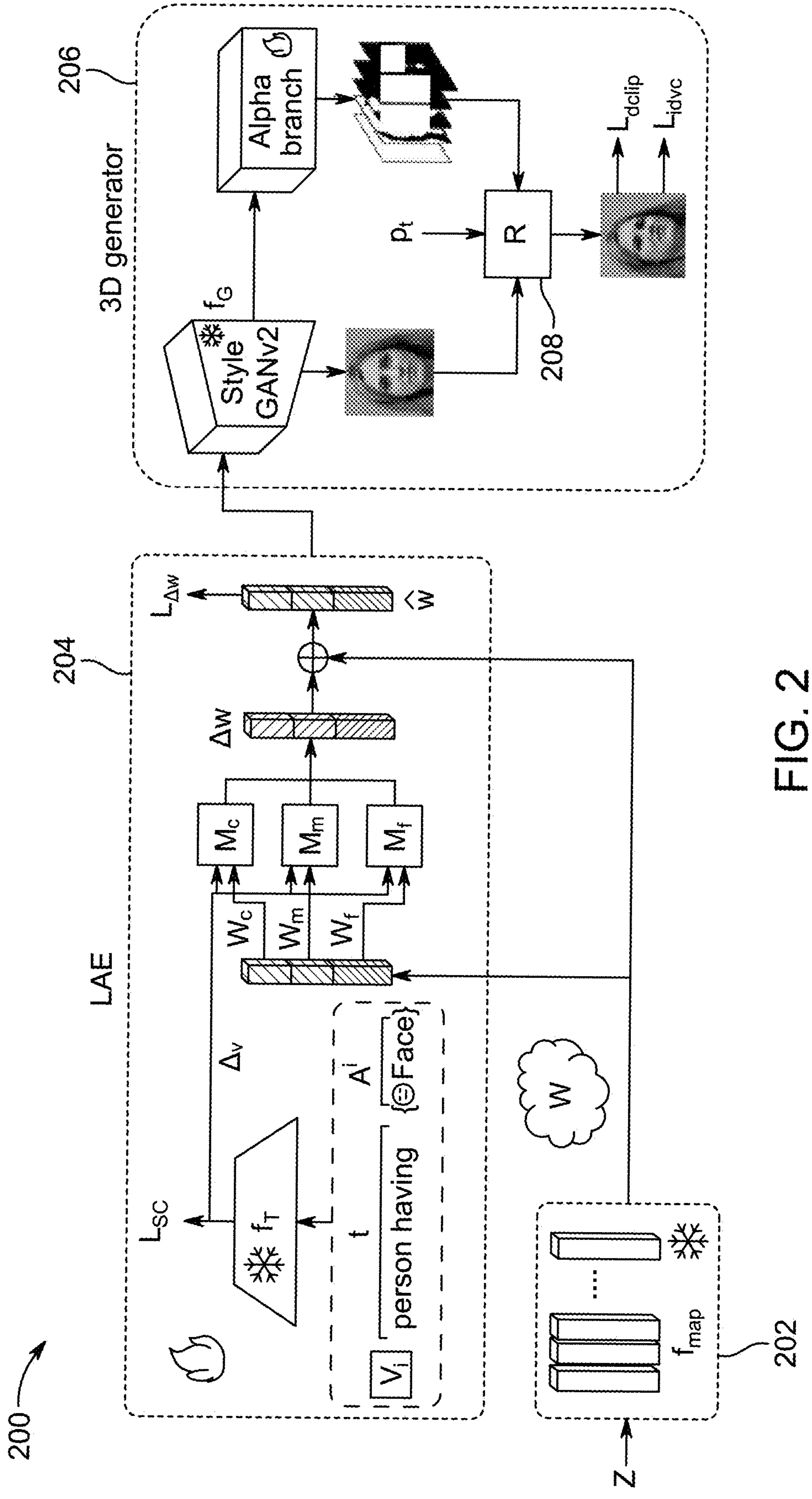
FIG. 2 is an exemplary diagram depicting an overall architecture of a computing device configured to perform image editing based on an attribute-specific text prompt, according to certain embodiments.

Referring now to FIG. 2, the present disclosure provides an exemplary diagram depicting an overall architecture 200 of the computing device 102 configured to perform the image editing based on the attribute-specific text prompt, according to certain embodiments. As depicted in the FIG. 2, the overall architecture 200 of the computing device 102 includes a mapping network 202 (depicted as '$f_{map}$'), a text-driven LAE 204, and a 3D generator (i.e., the 3D GAN) 206 (depicted as '$f_G$'), and a differentiable renderer 208 (depicted as 'R'). Initially, a noise code (z)~N (0,1) is acquired by the mapping network 202. Upon receiving the noise code (z), the mapping network 202 maps the noise code (z) to the latent code (w)∈W. This latent code (w) is then edited within the text-driven LAE 204 using an input prompt ($P^i_A$) which is a combination of the textual instruction ($A^i$), the system prompt (t), and the set of learnable style tokens ($V_i$) to obtain the edited latent code ($\hat{w}$). In particular, within the text-driven LAE 204, the input prompt $P^i_A$ (also referred to as an attribute-specific tokens) are learned and mapped into one or more textual embeddings ($\Delta$v) using a text encoder ($f_T$(.)) (also referred to as the CLIP text encoder). The resulting textual embeddings ($\Delta$v) and the latent code (w) are then used to generate the edited latent code ($\hat{w}$) using one or more style mappers, i.e., $M_c$, $M_m$, and $M_f$. The edited latent code ($\hat{w}$) is then passed to the 3D generator 206 (depicted as $f_G$), which produces a Red Green Blue (RGB) image (i.e., the color texture image) and the set of alpha maps. In particular, the StyleGANversion2 (also referred to as StyleGANv2) produces the RGB image and the set of alpha maps. The RGB image and the set of alpha images are then fed into the differentiable renderer 208, which synthesizes the RGB image and the set of alpha images with the target facial attribute at a specified target camera pose ($p_t$) to generate the 3D-aware and view-consistent image.

In an operative aspect, by giving the noise code (z), an attribute editing instruction (i.e., the textual instruction ($A^i$) specifying the target facial attribute to be edited), and the target camera pose ($p_t$) as an input, a goal of the computing device 102 is to generate multiplane representations (M) that can be used to render 3D-aware and view-consistent images having the target facial attribute. In an embodiment, a multiplane image can be represented as ($C_i$, $a_i$, $d_i$) for (L) fronto-parallel planes, where $C_i \epsilon R^{H*H*3}$ denotes a color texture for a plane, $a_i \epsilon$ $[0,1]^{H*H*1}$ and $d_i \epsilon R$ denotes the set of alpha maps and a depth for a corresponding plane (i.e., distance from the camera), respectively. Further, a GMPI (e.g., the GMPI StyleGANv2 with the alpha branch) is used to simplify the generation of the color texture image across all planes along with the set of alpha maps. The set of alpha maps along with a color texture ($C_i$) is then fed to the differentiable renderer 208 to generate the 3D-aware and view-consistent image at the target camera pose ($p_t$).

In addition to generating the 3D image, the present disclosure also aims to edit the 3D image to reflect the target facial attribute specified using the textual instruction ($A^i$). Therefore, the goal of the 3D generator 206 is to produce the RGB image with the target facial attribute and the corresponding set of alpha maps, given the noise code (z), the textual instruction ($A^i$), and the depth ($d_i$) of the planes. An output multiplane representation (M) is obtained using an equation 1 defined below:

$$M = \{C\{\alpha_1, \ldots, \alpha_l\}\} = f_G(z, A^i, \{d_1, \ldots, d_L\}) \quad (1)$$

Further, as already explained, the computing device 102 is end-to-end trained using a combination of the text-prompt-based attribute editing loss term ($L_T$) and the 3D-aware identity and pose preservation ($L_P$). The text-prompt-based attribute editing loss term ($L_T$) (including the directional CLIP loss term ($L_{Dclip}$) and the style token contrastive learning loss term ($L_{sc}$)) enables controllable editing of attributes (also referred to as the target facial attributes) in the generated 3D-aware and view-consistent image, while the 3D-aware identity and pose preservation ($L_P$) (including the identity preservation loss term ($L_{id}$), the identity consistency preservation loss term ($L_{idvc}$), the camera pose preservation loss term ($L_{latent}$), and the alpha-map consistency preservation loss term ($L_\alpha$)) ensures that the identity and the camera pose are maintained in the generated 3D-aware and view-consistent image.

Further, conventionally, GANs have shown impressive capabilities in generating highly realistic, unconditional 2D images. Among existing GANs, a StyleGAN has set a new benchmark in image generation, achieving state-of-the-art results. In addition to the ability of the StyleGAN to generate realistic images, the StyleGAN's latent space exhibits notable disentanglement properties. These disentanglement properties enable various image manipulations, such as altering hair color or modifying emotions. Such image manipulations can be achieved by traversing specific directions in the latent space, which are identified either through manual exploration or via attribute classifiers.

Further, recent advancements in a cross-modal Vision-Language (VL) representation learning have led to significant progress across a wide range of tasks. A notable example is a CLIP which was trained on 400 million image-text pairs. Further, textual embeddings ($\Delta v$) learned by the CLIP have proven to be highly effective across multiple domains. Building on this, a StyleCLIP leverages a pre-trained CLIP to identify manipulation directions using text prompts. While several subsequent works have explored text-guided image manipulation in the 2D space, the present disclosure stands apart by focusing on the 3D space, where the challenges are more complex due to additional factors like view consistency and 3D awareness. Moreover, the present disclosure demonstrates significantly enhanced efficiency, which can be attributed to a novel use of style tokens.

Additionally, in the 3D space, a generative 3D-aware image synthesis and manipulation have recently attracted significant attention as an extension of 2D GANs into 3D settings. These methods typically combine a 3D-structure-aware inductive bias in a generator with a use of neural rendering engines to achieve view-consistent results. Key approaches include mesh-based models and voxel-based GANs, which offer expressive power but come with high memory and computational costs, and fully implicit representation-based approaches. However, these key approaches often suffer from slow querying and sampling, making them less practical for training. Additionally, several works have proposed hybrid methods that combine different techniques to leverage the strengths of each existing approach. Moreover, recent conventional 3D face editing methods have faced significant challenges, primarily due to their reliance on predefined attribute classes, often resulting in limitations such as rigidity and high computational cost. These conventional 3D face editing methods typically require training the pre-existing attribute classifiers on large datasets, thereby making the process both time-consuming and resource-intensive. Consequently, they struggle to adapt to novel attributes in real-time applications, limiting their practicality for dynamic 3D-aware editing To overcome these challenges, the present disclosure discloses the text-driven LAE within the GMPI (i.e., the GMPI StyleGANv2 along with the alpha branch), along with 3D-aware attribute editing, identity, and pose preservation losses. The current approach (i.e., the text-driven LAE), as disclosed in the present disclosure, enables the synthesis and editing of the 3D face images with prompt-controllable attributes (e.g., hair color, style, expressions) while ensuring view consistency across various target poses. Additionally, the proposed text-driven LAE can be seamlessly integrated into other state-of-the-art 3D generation methods, enhancing their editing capabilities while maintaining both identity preservation and view consistency across multiple camera poses.

Further, the present disclosure utilizes multiple 3D-aware models, such as the GMPI which employs Multiplane Images (MPIs) for image representation and adapts the StyleGAN to achieve unconditional 3D-aware generation. The present disclosure also incorporates models like an Explicit Geometry 3D (EG3D) and others. The present disclosure focuses on editing image attributes (i.e., the target facial attributes) via text while maintaining 3D view consistency. In an embodiment, the conventional closest related work is Pretrained Implicit Editing for Manipulating 3D (PREIMD3D) images, which is built on the EG3D for 3D image generation and finds a semantic edit direction in an inversion manifold. The inversion manifold refers to a subspace within the latent space that contains valid latent codes corresponding to meaningful 3D image attributes. This semantic edit direction corresponds to modifying an attribute-specific pre-trained classifier's binary label. However, this conventional work requires considerable resources to train for novel attributes, a challenge that the present disclosure addresses with a more efficient approach.

In the present disclosure, a goal is to leverage the 3D GAN to enable novel attribute editing driven by natural language prompts, ensuring that the generated images (also referred to as edited images) are both 3D-aware and view-consistent, i.e., the 3D-aware and view-consistent image. In the present disclosure, a frozen 3D-aware StyleGAN is utilized, specifically the GMPI, to manipulate 3D images. To guide the latent space of the GMPI, the text-driven LAE is disclosed, which directs the 3D GAN toward the target facial attributes using the CLIP text encoder. The text-driven LAE disclosed in the present disclosure is highly efficient, as it only requires training of the set of learnable style tokens (i.e., attribute-specific style tokens) and the style mapper (i.e., a linear-layer-based style mapper), which can be easily integrated with different 3D generative models.

Figure 3:
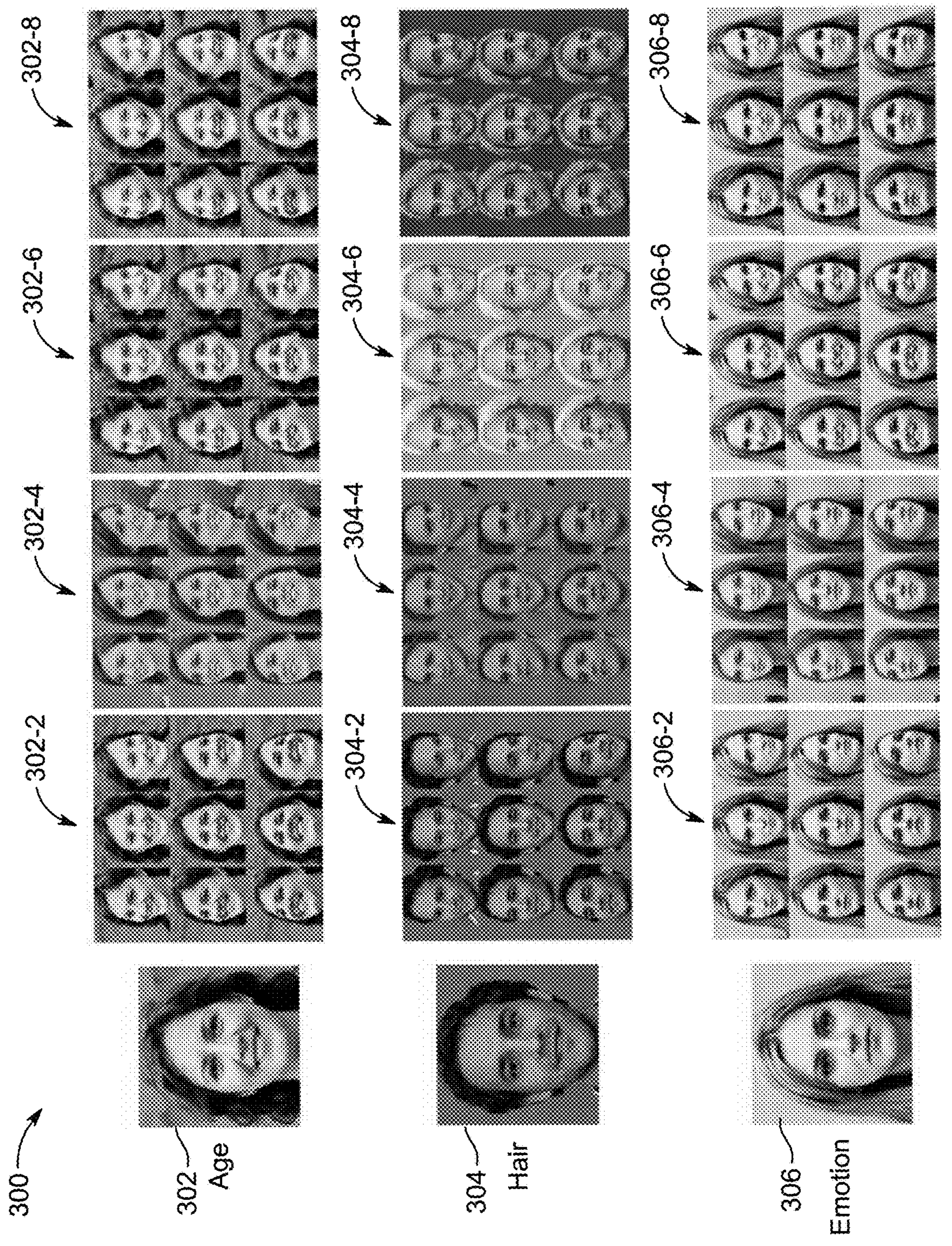
FIG. 3 is an exemplary pictorial representation depicting a plurality of images generated using a current approach and other conventional techniques, according to certain embodiments.

Referring now to FIG. 3, the present disclosure provides a pictorial representation 300 depicting a plurality of images generated using the current approach (implemented using the computing device 102) and other conventional techniques, according to certain embodiments. As depicted via the pictorial representation 300, images 302, 304, and 306 are processed using the GMPI, the PREIM3D, and the current approach (i.e., the text-driven LAE). In an embodiment, various attributes used for performing the processing of the images 302, 304 and 306 include age (e.g., young), hair color (e.g., blond), and emotion (e.g., happy), respectively. When the image 302, the image 304, and the image 306 is processed using the GMPI, an image 302-2, image 304-2, and an image 306-2 across various camera angles and attributes are generated. Further, images 302-4, 304-4, and 306-4 across various camera angles and attributes are generated based on processing of the images 302, 304, and 306, respectively, using the PREIM3D. Further, images 302-6, 304-6 and 306-6 depicting various camera angles and attributes are generated based on the processing of images 302, 304, and 306, respectively, using the current approach. Further, images 302-8, 304-8, and 306-8 depicting various camera angles and attributes are generated based on processing of the images 302, 304, and 306, respectively, using the current approach with custom prompts (i.e., the textual instruction (Ai) specifying the target facial attribute to be edited). For example, a custom prompt for the image 302 may be ‘make women of age 80’. Further, a custom prompt for the image 304 may be ‘make hair color green’. Further, a custom prompt for the image 306 may be ‘make the emotion neutral’. Further, as depicted in the FIG. 3, each corresponding image generated for the images 302, 304, and 306 includes 9 images with varying yaw angles ranging from −30° to 30° and pitch angles ranging from −20° to 20°. In an embodiment, a yaw angle is a rotation of an object (i.e., the human face) around its vertical axis (i.e., left or right), while a pitch angle is a rotation of the object around its horizontal axis (i.e., up or down).

As depicted in the FIG. 3, the current approach in face editing not only maintains the camera poses more accurately compared to the GMPI, but also demonstrates superior identity (e.g., the shape, the size, or any distinctive feature of the object) preservation and editing capability when compared to the PREIM3D. For instance, when modifying the hair color as depicted via the image 304 and corresponding images, i.e., the image 304-2, the image 304-4, the image 304-6, and the image 304-8, the current approach accurately maintains a subject's identity (i.e., features of the human face). The current approach ensures that the camera poses remain consistent. Additionally, the current approach demonstrates remarkable flexibility by allowing attribute changes based on natural language descriptions (i.e., the textual instruction ($A^i$)). To highlight this adaptability of the current approach, the image 302-8, the image 304-8, and the image 306-8 in FIG. 3 show results generated using arbitrary natural language textual prompts. Unlike the PREIM3D, which requires a pre-trained attribute classifier and several hours of training to edit a face with a new attribute, the current approach can achieve the same result in just a few minutes.

Further, conventionally, while the latent space of the StyleGAN has demonstrated a significant degree of disentanglement, it still requires identifying an appropriate editing direction for each attribute. However, since the current approach supports text-driven editing, a key challenge is to effectively learn and extract information from the textual instruction ($A^i$) so that a network (i.e., the 3D GAN) can generate images (i.e., the 3D-aware and view consistent images) with the target facial attribute. For this, the text-driven LAE is used, which consists of the set of learnable style tokens ($V_i$) and the style mapper. In an embodiment, each learnable style token corresponds to an editable facial attribute. Further, the text-driven LAE is trained using the text-prompt-based attribute editing loss term ($L_T$) that includes the directional CLIP loss term ($L_{Dclip}$) and the style token contrastive learning loss term ($L_{sc}$), and the 3D-aware identity and pose preservation term ($L_P$) that includes the identity preservation loss term ($L_{id}$), the identity consistency preservation loss term ($L_{idvc}$), the camera pose preservation loss term ($L_{latent}$), and the alpha-map consistency preservation loss term ($L_\alpha$).

In contrast to existing methods, the current approach uses the general prompt ($P^i_A$) to represent given attributes (A). The general prompt ($P^i_A$) is composed of learnable prompt vectors (i.e., the learnable style tokens)

$$\{[V]^i_1, [V]^i_2, \ldots, [V]^i_m\}$$

and the textual embedding (Δv) of the textual instruction ($A^i$) (also referred to as the text prompt). Further, the system prompts (t), which are independent of each class, are also included. The general prompt ($P^i_A$) is calculated using an equation 2 defined below.

$$P^i_A = [V]^i_1, [V]^i_2, \ldots, [V]^i_m, [t]_1, [t]_2, \ldots, [t]_l[A] \tag{2}$$

Further, in the current approach, $$\left\{\left\{\{[V]^i_j \in R^{d_l}\}_{j=1}^{m}\right\}_{i=1}^{n}\right\}$$

represents the set of learnable style tokens for each facial attribute. Here, ‘n’ is the number of facial attributes and ‘m’ is number of learnable style tokens. Further, $$\{t_l|_{l=1}^{L}\}$$

represents word embeddings which shares the same context with all facial attributes. Unless specified otherwise, m=1. Further, the text encoder ($f_T$) generates $\Delta v^i = f_T(\overline{Y}_i, \theta_{f_T})$, where ‘$\overline{Y}$’$_i$={$t_{SOS}$, $P^i_A$, $t_{EOS}$}, where ‘$t_{SOS}$’ and ‘$t_{EOS}$’ represent a start token embedding and an end token embedding, respectively. Further, ‘$\theta_{f_T}$’ is pre-trained weights.

Further, while ‘Δv’ represents the textual embedding (representing a style of the target facial attribute), it cannot be directly fed into the StyleGAN, i.e., the StyleGANv2, because it is not compatible with its latent space. To transform the textual embedding (Δv) into the editing direction (Δw), the linear mapper included within the style mapper (M) is used, such as, ‘Δw=M(Δv)’. Upon acquiring the noise code (z), the mapping network ‘$f_{map}$’ generates the latent code (w). The latent code (w) is divided into three groups, i.e., the group with coarse features ($w_c$), the group with middle features ($w_m$), and the group with fine features ($w_f$). In an embodiment, the group with coarse features ($w_c$) includes a high-level and global structure, such as major object shapes, rough outlines, and general spatial positioning for the 3D-aware and view-consistent image. The group with middle features ($w_m$) includes more detailed patterns and textures, such as facial structure, secondary object details, or intermediate-level details like clothing folds or background elements. Further, the group with fine features ($w_f$) represent fine-grained details for the 3D-aware and view-consistent image, such as facial wrinkles, hair strands, and intricate textures or small variations in the 3D-aware and view-consistent image that add realism and subtlety. The style mapper (M) consists of three sub-networks for these three groups with each sub-network comprising a single linear layer.

The style mapper (M) takes the textual embedding (Δv) to generate the editing direction (Δw). Further, based on the editing direction (Δw) and the latent code (w), the edited latent code (ŵ) is generated. The three sub-networks of the style mapper (M) can be formulated as depicted via equation 3 defined below:

$$M(w^i, \Delta v^i) = M_c(w_c^i, \Delta v^i), M_m(w_m^i, \Delta v^i), M_f(w_f^i, \Delta v^i) \quad (3)$$

In the above equation 3, 'i' represents '$i_{th}$' image. $w^i$ represents the latent code (w) for the '$i_{th}$' image. Further, $\Delta v^i$ represents the textual embedding (Δv) for the '$i_{th}$' image. Further, '$M_c$', '$M_m$', and '$M_f$' represents style mappers. Further, $$w_c^i\text{', '}w_m^i\text{', and '}w_f^i,$$

are the group with coarse features ($w_c$), the group with middle features ($w_m$), and the group with fine features ($w_f$) for the '$i_{th}$' image.

Further, the edited latent code (ŵ) is computed using equation 4, defined below:

$$\hat{w}^i = w^i + M(w^i, \Delta v^i) \quad (4)$$

In the above equation 4, '$\hat{w}^i$' represents the edited latent code (ŵ) for the '$i_{th}$' image.

Further, the edited latent code (ŵ) is provided as the input to the 3D-GAN (i.e., the 3D generator 206) to generate the multiplane images (MPIs) denoted as 'D' that includes the color texture image (e.g., the RGB image (C)) and the set of alpha maps, i.e., $\{\alpha_1, \ldots, \alpha_L\}$. These MPIs along with the target camera pose ($p_t$) are provided as input to the differentiable rendered 'R' to generate a final image, i.e., 3D-aware and view-consistent image. The final image is obtained using equation 5, defined below:

$$I_{p_t}^i = R(G_t(\hat{w}^i, \theta), p_t) \quad (5)$$

In the above equation 5, $$I_{p_t}^i,$$

represents the final image. 'R' represents the differentiable renderer. Here, '$G_t$' represents the 3D generator 206 ($f_G$), i.e., the 3D GAN. '$\hat{w}^i$', represents the edited latent code (ŵ) for the '$i_{th}$' image. 'θ' represents learned parameters (weights) and '$p_t$' represents the target camera pose.

Conventionally, a simple approach to guide the generation of the final image $$I_{p_t}^i,$$

based on the general prompt ($P_A^i$) is to align a target text prompt's semantic to use a CLIP-based image manipulation approach. This conventional approach involves minimizing a global clip loss function that is formulated as a way to achieve this alignment. However, the use of the global clip loss led to low diversity and corrupt outputs. To address these issues, the current approach uses, the directional CLIP loss term ($L_{Dclip}$) is used which offers significant improvements. Unlike the conventional approach, the directional CLIP loss term ($L_{Dclip}$) utilizes attribute-specific prompts and generates multi-view images on-the-fly, rather than relying on fixed, manually designed textual prompts and single-view images.

For the given latent code ($w^i$), the direction of a pair of a source image and a target image is calculated at two different camera poses, i.e., a camera pose '$p_{t_1}$' and a camera pose '$p_{t_2}$' using equation 6 defined below:

$$\Delta I_i = \frac{f_I(R(f_{G_t}(\hat{w}^i), p_{t_1}))}{\|f_I(R((f_{G_t}(\hat{w}^i), p_{t_1}))\|^2} - \frac{f_I(R(f_{G_0}(w^i), p_{t_2}))}{\|f_I(R(f_{G_0}(w^i), p_{t_2}))\|^2} \quad (6)$$

In the above equation 6, '$f_{G_0}$' represents an original GMPI generator (i.e., an original 3D generator) and '$f_I$' is an image encoder (i.e., the text encoder) of the CLIP.

Further, to identify an attribute-specific adaptation direction ($\Delta T_i$), an equation 7 defined below, is used.

$$\Delta T_i = \frac{f_T(P_A^i)}{\|f_T(P_A^i)\|} - \frac{f_T(t_{src})}{\|f_T(t_{src})\|} \quad (7)$$

In the above equation 7, '$t_{src}$' represents a semantic text of a final image '$I_{p_t}$'. For example, the '$t_{src}$' may be set as 'face'.

Further, the directional CLIP loss term ($L_{Dclip}$) is calculated using an equation 8 defined below:

$$L_{dclip} = E_{w^i \in W} \sum_{i=1}^{K} \left(1 - \frac{\Delta I \cdot \Delta T_i}{|\Delta I_i||\Delta T_i|}\right) \quad (8)$$

In the above equation 8, 'K' represents the number of attributes in each batch. The directional CLIP loss term ($L_{Dclip}$) constrains the direction of the different view images pair '$\Delta I_i$' with the attribute-specific image direction '$\Delta T_i$'.

Further, the current approach provided in the present disclosure employs 'n' distinct learnable style tokens ($V_i$), in which each learnable style token corresponds to a unique editable facial attribute. Since these learnable style tokens ($V_i$) share the style mapper, the learnable style tokens ($V_i$) can converge to a common orthogonal point in the textual embedding (Δv) space, which is common to all facial attributes. To prevent this, the style token contrastive learning loss term ($L_{sc}$) is used. The style token contrastive learning loss term ($L_{sc}$) works by minimizing similar learned style tokens. Specifically, for a set of 'n' attribute-specific style tokens $$P_A^1, P_A^2, \ldots, P_A^n$$

the style token contrastive loss term ($L_{sc}$) is defined using an equation 9 provided below:

$$L_{sc} = \sum_{i-1}^{K} \sum_{j-1, i \neq j}^{K-1} sim\left(\frac{f_T(P_A^i)}{\|f_T(P_A^i)\|}, \frac{f_T(P_A^j)}{\|f_T(P_A^j)\|}\right) \quad (9)$$

In the above equation 9, 'sim(.)' represents a cosine similarity and '$f_T$' is the text encoder (e.g., the CLIP text encoder).

In an embodiment, the style token contrastive loss term ($L_{sc}$) plays a pivotal role in enabling the simultaneous learning of multiple learnable style tokens specific to each facial attribute. Further, a total LAE loss, i.e., '$L_{LAE}$' is expressed using an equation 10 defined below:

$$L_{LAE} = \lambda_{Dclip} L_{Dclip} + \lambda_{sc} L_{sc} \quad (10)$$

In the above equation 11, '$\lambda_{dclip}$' and '$\lambda_{sc}$' denote the respective weights for each loss term, i.e., the directional CLIP loss term ($L_{Dclip}$) and the style token contrastive loss term ($L_{sc}$).

Further, the 3D-aware identity and pose preservation term ($L_P$) includes the identity preservation loss term ($L_{id}$). The identity preservation loss term ($L_{id}$) is employed to ensure the identity consistency across the different camera poses, as well as before and after the target facial attribute modification. The identity preservation loss term ($L_{id}$) is designed to preserve the identity of an original image (i.e., an initial image provided as input) and a modified image (also referred to as the 3D-aware and view-consistent image or the generated image) when viewed from a fixed frontal camera pose '$p_o$'. The identity preservation loss term ($L_{id}$) is formulated as depicted via an equation 11 defined below:

$$L_{id} = 1 - \cos\left(AF\left(R\left(f_{G_t}(\hat{w}), p_o\right)\right), \left(R\left(f_{G_o}(w), p_o\right)\right)\right) \quad (11)$$

In the above equation 11, 'R ($f_{G_t}(\hat{w})$, $p_o$)' is the attribute modified image at the target camera pose ($p_t$). Here, the target camera pose ($p_t$) is set as the fixed frontal camera pose '$p_o$'. Further, 'R($f_{G_o}$(w), $p_o$)' is an unmodified image (i.e., the original image) at the same camera pose '$p_o$'. 'cos(.)' is the cosine similarity, and 'AF(.)' is a pre-trained ArcFace Network for face recognition.

Further, the identity consistency preservation loss term ($L_{idvc}$) is used to ensure that the general prompt ($P^i_A$) does not deviate excessively and to maintain 3D consistency across different camera poses (also referred to as the target camera pose ($p_t$) and attributes (i.e., the target facial attributes). The identity consistency preservation loss term ($L_{idvc}$) minimizes the identity differences between images viewed from different camera poses. A goal of the identity consistency preservation loss term ($L_{idvc}$) is to enforce consistency by comparing the attribute-modified images (i.e., the 3D-aware and view-consistent images) and unmodified images (i.e., the original images) at various camera poses. The camera poses are sampled randomly, and the identity consistency preservation loss term ($L_{idvc}$) minimizes the identity discrepancy between the attribute-modified images and the unmodified images across these different camera poses. The identity consistency preservation loss term ($L_{idvc}$) is obtained using an equation 12 defined below:

$$L_{idvc} = \sum_{i=1}^{K} \sum_{j=1, i \neq j}^{K-1} 1 - \cos\left(AF\left(R\left(G_t(\hat{w}^i), p_{t_1}\right), \left(R\left(G_t(\hat{w}^j), p_{t_2}\right)\right)\right)\right) \quad (12)$$

In the above equation 12, '$p_{t_1}$' and '$p_{t_2}$' are different camera poses sampled randomly. The identity consistency preservation loss term ($L_{idvc}$) ensures the identity consistency between the different camera poses and the different text prompts.

Further, the camera pose preservation loss term ($L_{latent}$) is used to maintain the target camera pose ($p_t$) of the attribute-modified image, i.e., the 3D-aware and view-consistent image. For this, a constraint on the edited latent code ($\hat{w}$) to stay close to the latent code (w). The camera pose preservation loss term ($L_{latent}$) ensures that the target camera pose ($p_t$) remains consistent throughout an attribute editing process. The camera pose preservation loss term (Latent) is calculated using an equation 13 defined below:

$$L_{latent} = \|W - M(w, \Delta v)\|_2 \quad (13)$$

In the above equation 13, 'W' represents a target latent code, 'M' represents the style mapper, 'w' represents the latent code, and 'Δv' represents the textual embedding.

To further refine this editing process, an additional regularization, i.e., the alpha-map consistency preservation loss term ($L_\alpha$) is applied on the set of alpha maps. Since the set of alpha maps is also learnable, significant shifts in this set of alpha maps are prevented, which could otherwise lead to unwanted changes in perceived camera poses. To achieve this, an L2 norm is applied on the set of alpha maps during manipulation, i.e., $L_\alpha = \|H(\hat{w})\|_2$, where 'H' is a learnable alpha branch of the 3D Generator '$f_{G_t}$'. Overall, preservation losses, i.e., the 3D-aware identity and pose preservation term ($L_P$) is obtained using equation 14 defined below:

$$L_P = \lambda_{id} L_{id} + \lambda_{idvc} L_{idvc} + \lambda_{latent} L_{latent} + \lambda_\alpha L_\alpha \quad (14)$$

In the above equation 14, '$\lambda_{id}$', '$\lambda_{idve}$', '$\lambda_{latent}$', and '$\lambda_\alpha$' are hyperparameters for each corresponding loss term, i.e., the identity preservation loss term ($L_{id}$), the identity consistency preservation loss term ($L_{idvc}$), the camera pose preservation loss term ($L_{latent}$), and the alpha-map consistency preservation loss term (La), respectively. Further, the overall loss, '$L_{total}$' is '$L_{total}$=$L_T$+$L_P$', where '$L_T$' is the text-prompt-based attribute editing loss term, and '$L_P$' is the 3D-aware identity and pose preservation term.

In an experimental aspect, a pre-trained 3D generative model, i.e., the GMPI, was used as a base 3D GAN and kept frozen except for the set of alpha maps. To learn the attribute-specific prompt, a pre-trained CLIP text encoder is used. Further, the text encoder (e.g., the CLIP text encoder) is utilized for both training and inference, and its image encoder is used during training only. To train the text-driven LAE, in some embodiments, the '$\lambda_{dclip}$' is set to 1.0, '$\lambda_{sc}$' is set as 0.8, '$\lambda_{id}$' is set as 0.8, '$\lambda_{idve}$' is set as 0.5, '$\lambda_{latent}$' is set as 0.5, and '$\lambda_\alpha$' is set as 0.5. These above-defined values are just exemplary values. However, any similar values can be used to train the text-driven LAE based on the user requirements. Further, during the training, the text-driven LAE is optimized using an Adaptive Moment Estimation (Adam) optimization algorithm with a learning rate of 0.001 and hyperparameters $\beta_1$=0.9 and $\beta_2$=0.95. Further, in line with an approach used in the GMPI, 32 planes were employed during training and 96 planes were employed during inference (i.e., testing) to improve rendering quality. The use of more planes during the inference allows for finer detail and more accurate 3D representation. Further, a near depth and a far depth for an MPI representation are set to 0.95 and 1.12, respectively, determining the range of depths from the camera for the 3D scene. These values help slice the 3D scene into layers, affecting how objects at varying distances are represented. Additionally, a depth normalization is applied to ensure that the depth values are consistently scaled, which is crucial for maintaining quality and preventing depth-related discrepancies in the rendered images. To further evaluate, the trained text-driven LAE is further integrated with other 3D generative models like the EG3D, the StyleNeRF, and the CIP3D. Further, based on the integration, it is determined that the trained text-driven LAE is extremely efficient in terms of both computation and space requirements, as it only requires the set of learnable style tokens and the one or more style mappers to be trained and stored.

Figure 4B:
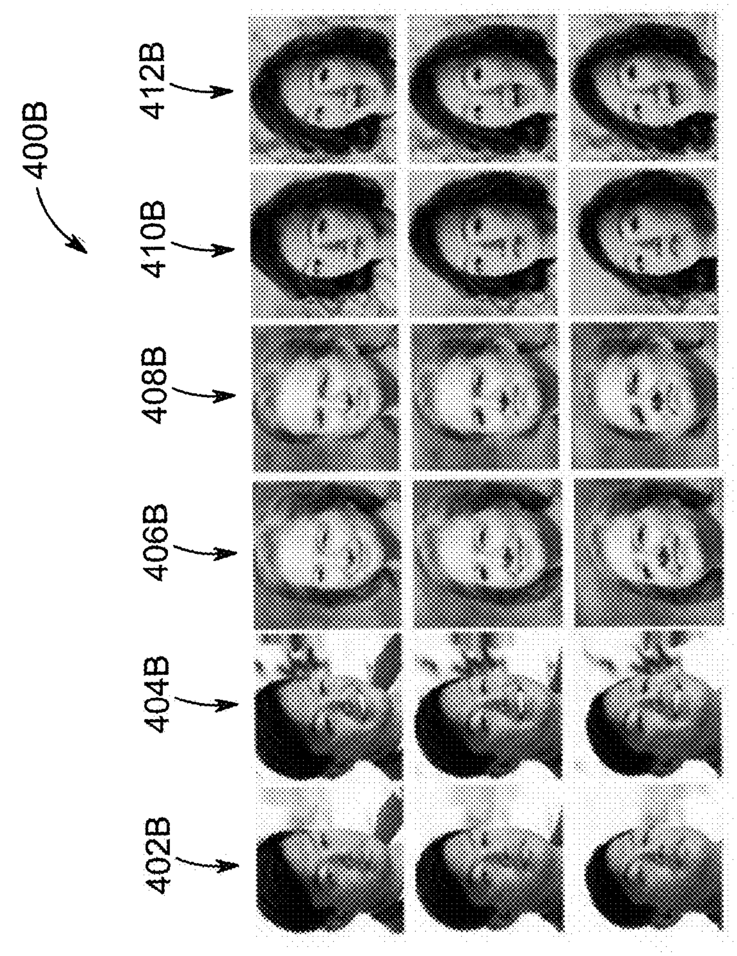
FIG. 4A-FIG. 4B represent exemplary pictorial diagrams depicting a comparison between results obtained from a Generative Multiplane Image (GMPI) and a current approach, according to certain embodiments.
Figure 4A:
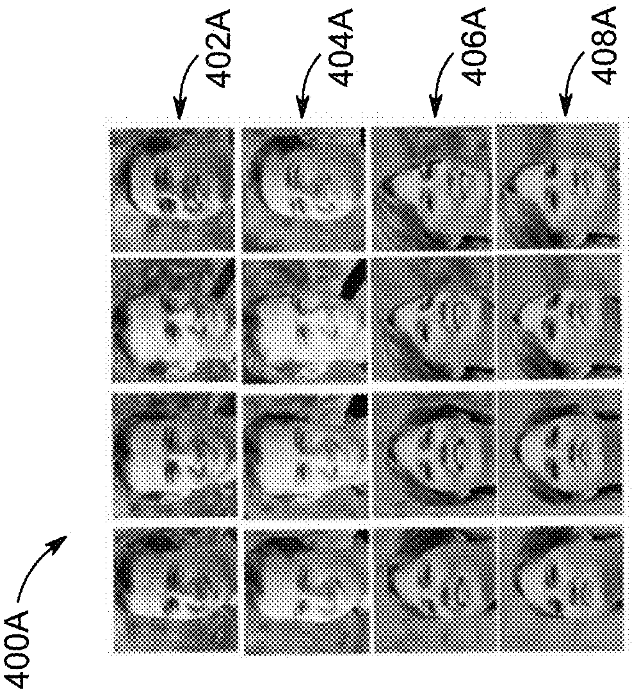

Referring now to FIG. 4A-FIG. 4B, the present disclosure provides exemplary pictorial diagrams representing a comparison between results obtained from the GMPI and the current approach, according to certain embodiments. As depicted in FIG. 4A, a pictorial diagram 400A represents results obtained using the GMPI and the current approach (i.e., the text-driven LAE), highlighting capabilities of the current approach and the GMPI in maintaining the camera pose (i.e., the target camera pose ($p_t$)) and preserving the identity. This comparison evaluates two different attributes, i.e., blue eye color (not visible in the FIG. 4A) and a specific emoji (e.g., a happy face or a sad face), across four randomly selected camera angles. As depicted via the pictorial diagram 400A, each image in a first row 402A represents results obtained based on processing performed by the GMPI for an original image (e.g., a male human face image) for a target facial attribute, e.g., the blue eye color. Further, each image in a second row 404A represents results obtained based on processing performed using the current approach (i.e., the text-driven LAE along with the 3D-GAN) for the original image (e.g., the male human face image) for the same target facial attribute, e.g., the blue eye color. Further, each image in a third row 406A represents results obtained based on processing performed by the GMPI for an original image (e.g., a female human face image) for a target facial attribute, e.g., the happy face. Further, each image in a fourth row 408A represents results obtained based on processing performed using the current approach (i.e., the text-driven LAE along the 3D-GAN) for the original image (e.g., the female human face image) for a target facial attribute, e.g., the sad face. The images in the second row 404A and the fourth row 408A clearly show how the current approach handles the editing of complex and challenging target facial attributes, such as the sad face and the blue eye color, while maintaining both the camera pose (also referred to as the target camera pose ($p_t$) or the camera angle) and the subject's identity (i.e., the features of the female human face).

Additionally, the current approach leverages a Celebrity Faces Attributes High-Quality (i.e., CelebA-HQ) dataset to showcase the ability of the current approach in editing real images. In this experiment, first each image is inverted to obtain their latent codes (w) using an Encoder for Editing (E4E). These latent codes (w) are then edited using the current approach, and the results are presented via a pictorial diagram 400B in FIG. 4B. As depicted in FIG. 4B, each image in a first column 402B represents the results obtained based on processing performed by the GMPI for an original image (e.g., a male human face image) for a target facial attribute, e.g., a neutral face.

Further, each image in a second column 404B represents results obtained based on processing performed using the current approach (i.e., the text-driven LAE and the 3D-GAN) for the original image (e.g., the male human face image) for the same target facial attribute, e.g., the happy face. Further, each image in a third column 406B represents the results obtained based on processing performed by the GMPI for an original image (e.g., a female human face image) for the target facial attribute, e.g., the happy face. Further, each image in a fourth column 408B represents results obtained based on processing performed using the current approach (i.e., the text-driven LAE and the 3D-GAN) for the original image (e.g., the female human face image) for a target facial attribute, e.g., a disgusted face. Further, each image in a fifth column 410B represents the results obtained based on processing performed by the GMPI for an original image (e.g., a female human face image) for a target facial attribute, e.g., a neutral face. Further, each image in a sixth column 412B represents results obtained based on processing performed using the current approach (i.e., the text-driven LAE and the 3D-GAN) for the original image (e.g., the female human face image) for a target facial attribute, e.g., a surprised face. As depicted via the pictorial diagram 400B, the current approach effectively preserves both the subject's identity and the camera pose while modifying desired facial attributes. It is important to note that a preservation quality achieved by the current approach is ultimately bounded by the limitations (i.e., GMPI's constraints on the subject's identity preservation or the camera pose consistency) of the GMPI.

Figure 5:
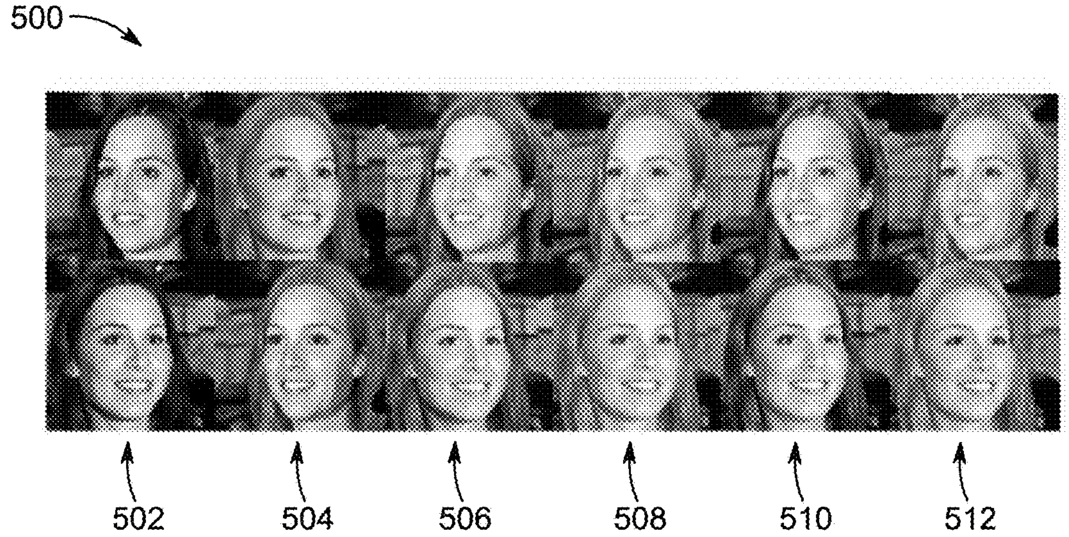
FIG. 5 is an exemplary pictorial diagram representing results obtained based on a textual instruction including text corruption, according to certain embodiments.

Referring now to FIG. 5, the present disclosure provides an exemplary pictorial diagram 500 representing results obtained based on the textual instruction with text corruption, according to certain embodiments. In an embodiment, to evaluate the robustness of the current approach (i.e., the text-driven LAE along with the 3D-GAN), some standard text corruptions were introduced into the textual instruction ($A^i$) (also referred to as the text prompt or the attribute-specific prompt) while attempting to edit the target facial attribute, e.g., an orange hair color. These standard text corruptions include common text perturbations such as typos, misspellings, and semantic alterations. In particular, four standard types of text perturbations, i.e., a Character Deletion (CD), a Character Insertion (CI), Optical Character Recognition (OCR) errors, and a Word Insertion (WI) were used. Each of these four standard types of text perturbations is represented via a Table 1.

TABLE 1

| Text Perturbations | Change in text prompt |
|---|---|
| Character Deletion (CD) | Orang[X] |
| Character Insertion (CI) | Ora?ge |
| Optical Character Recognition (OCR) errors | 0range |
| Word Insertion (WI) | A face with and orange hair |

In Table 1 above, each row of a first column, i.e., 'text perturbations' represents a name of a text perturbation. Further, each row in a second column, i.e., 'change in text prompt' represents a change done to the textual instruction ($A^i$) specifying the target facial attribute. In an embodiment, these text perturbations are applied while attempting to edit the target facial attribute, i.e., the orange hair color, as shown via the pictorial diagram 500 in FIG. 5.

Further, in FIG. 5, a first column 502 represents two images provided as an input to the 3D-GAN. Further, each row of a second column 504 represents a corresponding image generated for the two images using the current approach (i.e., the text-driven LAE along the 3D-GAN) when a correct textual instruction ($A^i$), e.g., 'make hair color of this women orange' for the textual facial attribute, i.e., the orange hair color was provided. Further, each image in a third column 506 represents results obtained using the current approach when a textual instruction ($A^i$) with a text perturbation CD, e.g., 'make hair color of this woman orang [X]' was received as an input. Each image in a fourth column 508 represents results obtained using the current approach when a textual instruction ($A^i$) with a text perturbation CI, e.g., 'make hair color of this woman ora?ge' was received as the input. Each image in a fifth column 510 represents results obtained using the current approach when a textual instruction ($A^i$) with a text perturbation OCR error, e.g., 'make hair color of this women 0range' was received as the input. Lastly, each image in a sixth column 508 represents results obtained using the current approach when a textual instruction ($A^i$) with a text perturbation WI, e.g., 'make face of this women with and orange hair' was received as the input.

As depicted in the FIG. 5, the current approach demonstrated strong robustness by effectively handling these text perturbations and maintaining the desired facial attribute.

Figure 6:
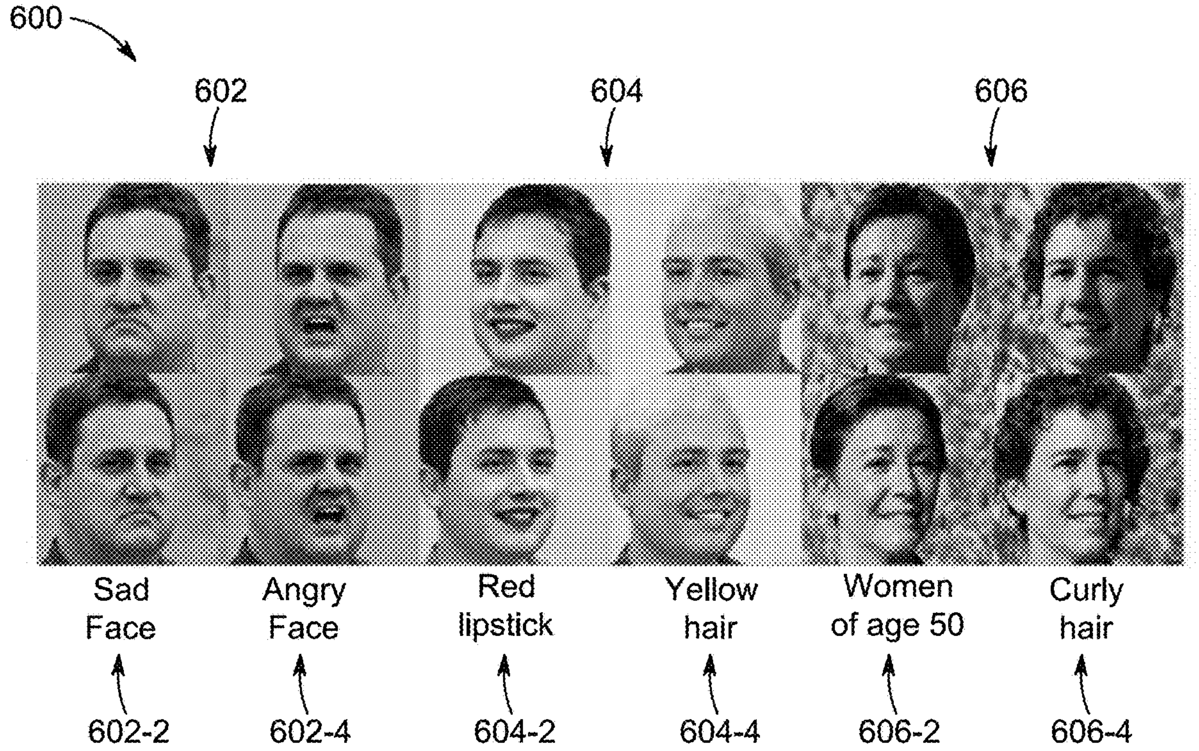
FIG. 6 is an exemplary pictorial diagram representing results obtained by integrating a text-driven Latent Attribute Editor (LAE) with state-of-the-art Three-Dimensional (3D) generation models, according to certain embodiments.

Referring now to FIG. 6, the present disclosure provides an exemplary pictorial diagram 600 representing results obtained by integrating the text-driven LAE with state-of-the-art 3D generation models, according to certain embodiments. In an embodiment, the state-of-the-art 3D generation models may include the StyleNeRF, a Conditional Image-to-Image Synthesis for 3D Object Generation (CIPS-3D), and the EG3D. The integration of the text-driven LAE with the state-of-the-art 3D generation models allows for visually assessing the improvements in image quality, realism, and fidelity in outputs generated using the state-of-the-art 3D generation models, demonstrating the effectiveness of the text-driven LAE when applied to advanced generative model frameworks.

As depicted via the pictorial diagram 600 in FIG. 6, in block 602, results of an integration of the text-driven LAE with the StyleNeRF are depicted. Each image in a first column 602-2 of the block 602 represents the resulting images obtained based on the processing performed by the text-driven LAE with the StyleNeRF for a target facial attribute 'sad face'. Further, each image in a second column 602-4 represents the resulting images obtained based on the processing performed by the text-driven LAE with the StyleNeRF for a target facial attribute 'angry face'. Further, in block 604, results of an integration of the text-driven LAE with the CIPS-3D are depicted. Each image in a third column 604-2 of the block 604 represents the resulting images obtained based on the processing performed by the text-driven LAE with the CIPS-3D for a target facial attribute 'red lipstick'. Further, each image in a fourth column 604-4 represents the resulting images obtained based on the processing performed by the text-driven LAE with the CIPS-3D for a target facial attribute 'yellow hair color'. Further, at block 606, results of an integration of the text-driven LAE with the EG3D are depicted. Each image in a fifth column 606-2 of the block 606 represents the resulting images obtained based on the processing performed by the text-driven LAE with the EG3D for a target facial attribute 'women of age 50'. Further, each image in a sixth column 606-4 represents the resulting images obtained based on the processing performed by the text-driven LAE with the EG3D for a target facial attribute 'curly hair'. In an embodiment, the general prompts ($P^i_A$) (also referred to as attribute-specific prompts) are learned to find an editing direction in W-space of the state-of-the-art 3D generation models and to have multi-view consistency and identity preservation which uses the identity consistency preservation loss term ($L_{idvc}$) and the camera pose preservation loss term ($L_{latent}$).

Further, based on the integration, a quantitative ablation analysis to assess an impact of integrating the text-driven LAE with the state-of-the-art 3D generation models on image quality was conducted. In addition, by comparing the performance of the state-of-the-art 3D generation models before and after the integration of the text-driven LAE, key metrics, such as an image sharpness, a texture fidelity, and an overall perceptual quality were measured. This quantitative ablation analysis provides an objective evaluation of the contribution of the text-driven LAE in enhancing the generative capabilities of the underlying state-of-the-art 3D generation models.

In a Table 2, a quantitative evaluation of an image quality following the integration of the text-driven LAE with the state-of-the-art 3D generation models is depicted. For the quantitative evaluation, two standard metrics, such as a Fréchet Inception Distance (FID) and a Kernel Inception Distance (KID) are used. The FID is a widely used metric for evaluating the quality of generated images by measuring a distance between feature distributions of real images (also referred to as the original images) and the generated images. A lower value of FID means the generated images are closer to the real images in terms of distribution. A higher value of the FID means that the generated images have more significant differences from the real images, meaning lower quality or less realism. Further, the KID is another metric that evaluates the quality of the generated images, similar to the FID. The KID is based on an inception network, but unlike the FID, the KID uses a Maximum Mean Discrepancy (MMD) with a polynomial kernel to compare the feature distributions of the real images and the generated images. A lower value of the KID indicates that the generated images are closer to the real images, with better visual quality.

TABLE 2

| Method | FID value (↓) | KID value (↓) |
|---|---|---|
| GMPI + | 25.91 | 0.074 |
| the text-driven LAE | 26.57 | 0.076 |
| StyleNeRF + | 22.12 | 0.039 |
| the text-driven LAE | 24.49 | 0.042 |
| CIPS-3D + | 17.89 | 0.031 |
| the text-driven LAE | 18.10 | 0.033 |
| EG3D + | 13.69 | 0.018 |
| the text-driven LAE | 15.12 | 0.021 |

In the Table 2 above, each row of a first column, i.e., 'method' represents a name of a state-of-the-art 3D generation model integrated with the text-driven LAE. Each row of a second column, i.e., 'FID values' represents FID values obtained for a corresponding method based on two different attributes. Further, each row of a third column, i.e., 'KID values' represents KID values obtained for a corresponding method based on two different attributes. As depicted via the FIG. 6 and the Table 2, the integration of the text-driven LAE adds attribute editing capabilities to existing state-of-the-art 3D generation models without compromising the overall quality of the generated images. Specifically, the generated images retain high fidelity while exhibiting the desired attribute modifications, showcasing the robustness and the efficiency of the text-driven LAE.

Further, a Table 3 represents a comparison of the text-driven LAE with some state-of-the-art 3D generation models, i.e., a 3D inversion (3D-Inv), a PixelNeRF, and the PRIEM3D using two key metrics, i.e., an Attribute Altering (AA) and an Attribute Dependency (AD). These two key metrics are evaluated across various attributes, following the PRIEM3D protocol. The PRIEM3D protocol is a standardized evaluation framework used to assess the performance of 3D image editing models, i.e., the state-of-the-art 3D generation models, specifically focusing on how well each model can manipulate and alter attributes in 3D images. Further, the AA measures a degree of change in the target facial attribute based on a given text prompt (i.e., the textual 5 instruction ($A^t$)). The AD quantifies how other attributes are affected when altering the particular target facial attribute.

TABLE 3

| | Method | Smile | Age | Makeup | Male | Grey Hair | Lipstick | Bowlcut |
|---|---|---|---|---|---|---|---|---|
| AA (↑) | 3D-Inv | 1.49 | 1.41 | 1.58 | 1.49 | 1.60 | 1.51 | — |
| | Pixel2NeRF | 1.47 | 1.42 | 1.64 | 1.55 | 1.63 | 1.56 | — |
| | PRIEM3D | 1.51 | 1.54 | 1.74 | 1.62 | 1.71 | 1.62 | NA |
| | The text-driven LAE | 1.69 | 1.62 | 1.86 | 1.70 | 1.76 | 1.71 | 1.66 |
| AD (↓) | 3D-Inv | 0.56 | 0.94 | 1.11 | 1.03 | 0.78 | 0.80 | — |
| | Pixel2NeRF | 0.57 | 1.23 | 0.92 | 0.99 | 0.61 | 0.74 | — |
| | PRIEM3D | 0.49 | 0.82 | 0.88 | 0.91 | 0.63 | 0.75 | NA |
| | The text-driven LAE | 0.42 | 0.71 | 0.89 | 0.77 | 0.58 | 0.73 | 0.68 |

In the above Table 3, each row of a first column represents a name of a key metric, i.e., AA and AD. Further, each row of a second column, 'method' represents a name of a model (i.e., the state-of-the-art 3D generation models and the text-driven LAE). Further, each row of a third column, i.e., 'smile', represents values of the two key metrics obtained based on the processing of an original image performed by a corresponding model for a target facial attribute 'smile'. Similarly, each row of a fourth column, a fifth column, a sixth column, a seventh column, an eight column, and a ninth column, represents values of the two key metrics obtained based on the processing of the original image performed by the corresponding model for a target facial attribute 'age', 'makeup, 'male', 'gray hair', 'lipstick', and 'bowlcut', respectively.

As depicted via the Table 3, the text-driven LAE significantly outperforms all the baselines in both key metrics, demonstrating its superior ability to modify attributes and manage attribute dependencies effectively. In the Table 3, 'NA' indicates that a corresponding 3D generation model (i.e., the PRIEM3D) does not include a trained classifier for editing the specified target facial attribute. In contrast, the text-driven LAE is capable of generating any novel attribute, offering greater flexibility and control in attribute manipulation. In particular, as shown in the Table 3, the text-driven LAE consistently outperforms other state-of-the-art 3D generation models across all attributes, demonstrating superior editing capabilities. Crucially, the text-driven LAE achieves these improvements without unintentionally altering unrelated attributes, ensuring precise and controlled attribute manipulation.

Further, a Table 4 below depicts a result of a comparison of the text-driven LAE with that of the state-of-the-art 3D generation model based on critical aspects, like, a depth accuracy and a pose accuracy (also referred to as the camera pose accuracy or the camera pose consistency). As shown in the Table 4, the depth accuracy and the pose accuracy of the text-driven LAE are comparable to the other state-of-the-art 3D generation models, demonstrating that the text-driven LAE achieves similar performance in these critical aspects.

Table 4

| | Depth (↓) | | | Poses (↓) | | |
|---|---|---|---|---|---|---|
| Method | Smile | Makeup | Age | Smile | Makeup | Age |
| GMPI | 0.49 | 0.49 | 0.49 | 0.00040 | 0.00040 | 0.00040 |
| The text-driven LAE | 0.51 | 0.50 | 0.52 | 0.00042 | 0.00046 | 0.00043 |
| EG3D | 0.31 | 0.31 | 0.31 | 0.00050 | 0.00050 | 0.00050 |
| The text-driven LAE | 0.33 | 0.31 | 0.33 | 0.00053 | 0.00054 | 0.00051 |

In the above Table 4, each row of a first column 'method' represents a name of a model (i.e., the state-of-the-art 3D generation models and the text-driven LAE). Further, a second column 'depth' includes three sub-columns, each depicting a unique target facial attribute, i.e., 'smile', 'makeup', and 'age'. Further, a third column 'pose' includes three sub-columns, each depicting a unique target facial attribute, i.e., 'smile', 'makeup', and 'age'. Further, each row of these three sub-columns of the second column 'depth' and the third column 'pose' represents values of the critical aspects, i.e., the depth accuracy and the pose accuracy obtained based on the processing of the original image performed by a corresponding model for the target facial attribute 'smile', 'makeup', and 'age'.

Further, as depicted in Table 4, the GMPI and the EG3D lack attribute editing capabilities, when evaluated using a single averaged value across a set of 1000 images. In other words, both the GMPI and the EG3D cannot edit specific target facial attributes (like smile, makeup, or age) in the generated images. In contrast, the text-driven LAE computes an average value for each of three target facial attributes using the set of 1000 images for each attribute, providing a more detailed evaluation.

In comparison of the depth accuracy and the pose accuracy between the GMPI, the EG3D, and the text-driven LAE, the text-driven LAE consistently preserves the depth accuracy and the pose accuracy across different target facial attributes. For example, when editing the smile, the text-driven LAE achieves a depth accuracy of 0.51, slightly lower than the GMPI's depth accuracy of 0.49 (where lower values indicate better accuracy). This result is obtained while using a GMPI backbone. Further, a similar pattern is observed upon integrating the text-driven LAE with the EG3D. These results are consistent across the makeup and the age attributes as well. In particular, the text-driven LAE can maintain 3D geometry and the camera pose consistency while effectively enabling attribute editing, highlighting the robustness and flexibility of the text-driven LAE.

Figure 7:
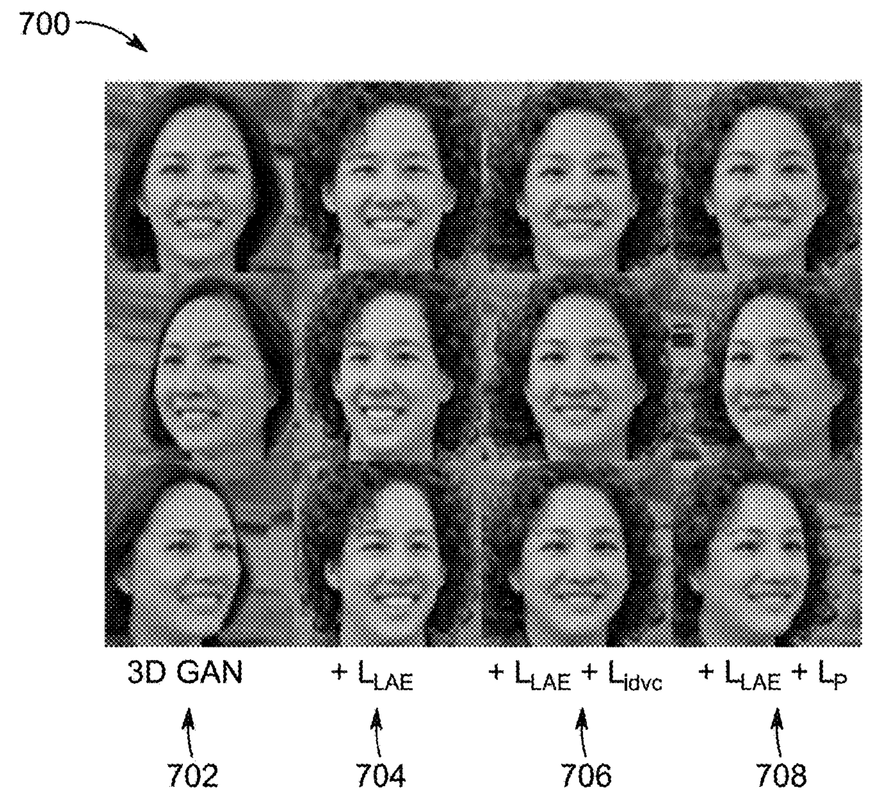
FIG. 7 is an exemplary pictorial diagram representing an impact of incorporating a loss function and the text-driven LAE into a 3D generation model, according to certain embodiments.

Referring now to FIG. 7, the present disclosure provides an exemplary pictorial diagram 700 representing an impact of incorporating the loss function and the text-driven LAE into a 3D generation model, according to certain embodiments. The loss function includes the text-prompt-based attribute editing loss term ($L_T$) and the 3D-aware identity and pose preservation term ($L_P$). In particular, the FIG. 7 illustrates the impact of incorporating the loss function and the text-driven LAE into the 3D generation model (i.e., the state-of-the-art 3D generation model) for editing a target facial attribute, e.g., 'curly hair'. When the text-driven LAE is integrated with a loss ($L_{LAE}$), significant changes are observed in the target facial attribute, demonstrating the importance of using the loss ($L_{LAE}$) during the training of the text-driven LAE.

However, while the desired target facial attribute (curly hair) is successfully modified, the text-driven LAE struggles to preserve both the identity and the camera pose of the generated images. This limitation is addressed by introducing the identity preservation loss term ($L_{id}$) and the identity consistency preservation loss term ($L_{idvc}$), which helps in maintaining the identity of the generated images (i.e., the 3D-aware and view-consistent image), ensuring that each generated image retains a similar appearance to an original image. However, despite improving the identity preservation, the camera pose consistency is still not adequately preserved with these losses. To resolve this issue of the camera pose consistency, the overall loss ($L_{total}$) is used, which effectively preserves both the identity and the camera pose while generating the 3D-aware and view-consistent images with the desired target facial attribute (e.g., curly hair). The usage of the overall loss ($L_{total}$) ensures that the generated images not only reflect an intended target facial attribute change but also maintain consistency in the camera pose and the identity of the object (also referred to as a subject), resulting in more realistic and coherent 3D images.

In FIG. 7, each image in a first column 702 represents images generated based on the processing performed by the 3D-GAN. Further, each image in a second column 704 represents images generated by the 3D-GAN based on the target facial attribute (i.e., curly hair), when the loss ($L_{LAE}$) is applied. Further, each image in a third column 706 represents images generated by the 3D-GAN based on the target facial attribute, when the loss ($L_{LAE}$) and the identity consistency preservation loss term ($L_{idvc}$), i.e., ($L_{LAE}+L_{idvc}$) is applied. Further, each image in a fourth column 708 represents images generated by the 3D-GAN based on the target facial attribute, when the loss ($L_{LAE}$) and the 3D-aware identity and pose preservation term ($L_P$), i.e., ($L_{LAE}+L_P$) is applied.

Further, a Table 5 below represents a quantitative evaluation of how different loss functions affect the preservation of the identity and the camera pose consistency when editing the 'curly hair' facial attribute. To perform the quantitative evaluation, a mean ArcFace similarity score is calculated across a range of generated images and edited faces, with the evaluation conducted under random camera poses. The mean ArcFace similarity score refers to an average similarity between two facial images that quantifies how similar two facial images are in terms of the identity.

TABLE 5

| Method | ID (0-10) (↑) | ID (10-30) (↑) | Depth (↓) | Camera Poses (↓) |
|---|---|---|---|---|
| 3D-GAN | 0.73 | 0.70 | 0.53 | 0.0004 |
| $+L_{LAE}$ | 0.66 | 0.65 | 0.61 | 0.0006 |
| $+L_{LAE} + L_{idvc}$ | 0.71 | 0.68 | 0.60 | 0.0006 |
| $+L_{LAE} + L_P$ | 0.72 | 0.70 | 0.54 | 0.0004 |

In the Table 5, each row of a first column 'method' represents a name of a model (e.g., 3D-GAN) and a loss function. Further, each row of a second column 'ID (0-10)' represents an Identity (ID) score obtained based on the processing of an original image using the integration of the text-driven LAE with the corresponding model or the loss function for camera pose ranging from 0 to 10 degrees. Further, each row of a third column 'ID (10-30)' represents an ID score obtained based on the processing of the original image using the integration of the text-driven LAE with the corresponding model or the loss function for camera pose ranging from 10 to 30 degrees. Further, each row of a fourth column 'depth' represents a depth accuracy score obtained based on the processing of the original image using the integration of the text-driven LAE with the corresponding model or the loss function. Further, each row of a fifth column 'camera pose' represents a camera pose consistency score obtained based on the processing of the original image using the integration of the text-driven LAE with the corresponding model or the loss function.

For example, when the text-driven LAE is integrated with the loss ($L_{LAE}$) as depicted via a second row, the ID score is 0.66 is obtained for the camera poses ranging from 0 to 10 degrees, and 0.65 is obtained for the camera poses ranging from 10 and 30 degrees. The depth accuracy score is approximately 0.61, and the camera pose consistency score is around 0.0006. In contrast, when the text-driven LAE is integrated with the overall loss ($L_{total}$), a noticeable improvement is observed across all evaluation metrics. The ID score ranging from 0 to 10 degrees increases from 0.66 to 0.72, indicating better preservation of the identity across different camera poses. The depth accuracy score improves from 0.61 to 0.54 (lower value indicating better accuracy), showing better depth consistency. Finally, the camera pose consistency score improves slightly from 0.0006 to 0.0004 (lower value indicating better accuracy), demonstrating better stability of the camera poses.

Figure 8:
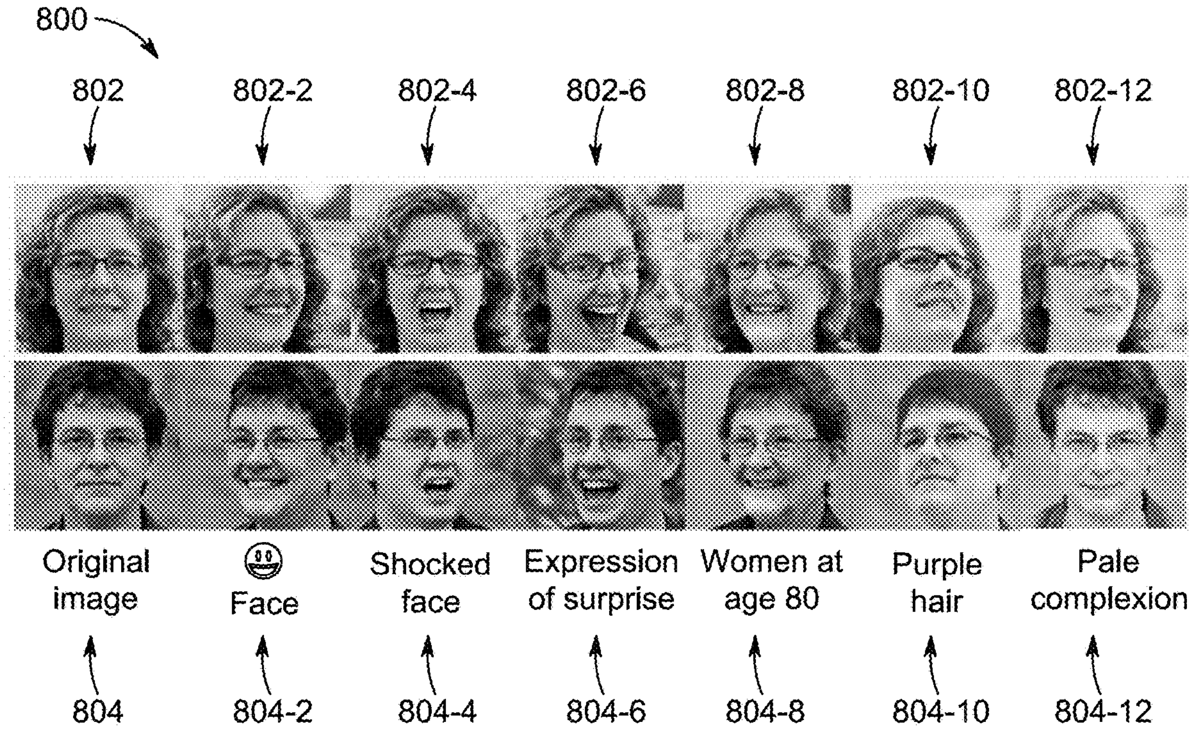
FIG. 8 is an exemplary pictorial diagram representing the attribute-specific text prompt based image editing, according to certain embodiments.

Referring now to FIG. 8, the present disclosure provides an exemplary pictorial diagram 800 representing image editing performed based on the attribute-specific text prompt, according to certain embodiments. As depicted in the FIG. 8, image 802 and image 804 represent original images on which the image editing is performed using the current approach (i.e., the text-driven LAE). To perform the image editing, the textual instruction ($A^i$) specifying the target facial attribute to be edited is acquired. In an embodiment, the textual instruction ($A^i$) specifying the target facial attribute is acquired from the user. For example, suppose the textual instruction ($A^i$) is 'make a happy face'. In this textual instruction ($A^i$), the target facial attribute is 'happy face'. Further, based on this textual instruction ($A^i$), an image 802-2 and an image 804-2 is generated corresponding to the image 802 and the image 804, respectively. Similarly, an image 802-4 and image 804-4 is generated for the target facial attribute 'shocked face'. Thereafter, images 802-6 and image 804-6 are generated for the target facial attribute 'expression of surprise.' Further, images 802-8 and 804-8 are generated for the target facial attribute 'women at age 80'. An image 802-10 and an image 804-10 are generated for the target facial attribute 'purple hair'. Additionally, images 802-12 and image 804-12 are generated for the target facial attribute 'pale complexion'.

A Table 6 below represents a comparison of the capabilities of the current approach (i.e., the text-driven LAE) with other state-of-the-art 3D generation models. In Table 6, each row of a first column 'method' represents a name of a model, i.e., the current approach and the other state-of-the-art 3D generation models. Further, each row of a second column 'editability' represents an editability capability of the corresponding model. Each row of a third column '3D-aware' represents a 3D-aware capability of the corresponding model. Further, each row of a fourth column 'text-driven' represents a text-driven capability of the corresponding model. Further, each row of a fifth column 'efficient for novel attributes' represents whether the corresponding model is capable of performing the image editing based on any novel attribute (e.g., a unique eyewear style). In the Table 6, 'X' denotes that the corresponding model does not support a following capability. Further, '✓' denotes that the corresponding model supports the following capability. For example, the StyleGAN supports the editability capability. However, the StyleGAN does not support the 3D-aware capability, the text-driven capability, and the efficiency for novel attributes. In contrast, the current approach, i.e., the text-driven LAE supports the editability capability, the 3D-aware capability, the text-driven capability, and the efficiency for novel attributes.

TABLE 6

| Methods | Editability | 3D-aware | Text-Driven | Efficient for novel attributes |
|---|---|---|---|---|
| StyleGAN | ✓ | X | X | X |
| CLIPStyle | ✓ | X | ✓ | X |
| EG3D | X | ✓ | X | X |
| GMPI | X | ✓ | X | X |
| PREIM3D | ✓ | ✓ | X | X |
| The text-driven LAE | ✓ | ✓ | ✓ | ✓ |

Figure 9:
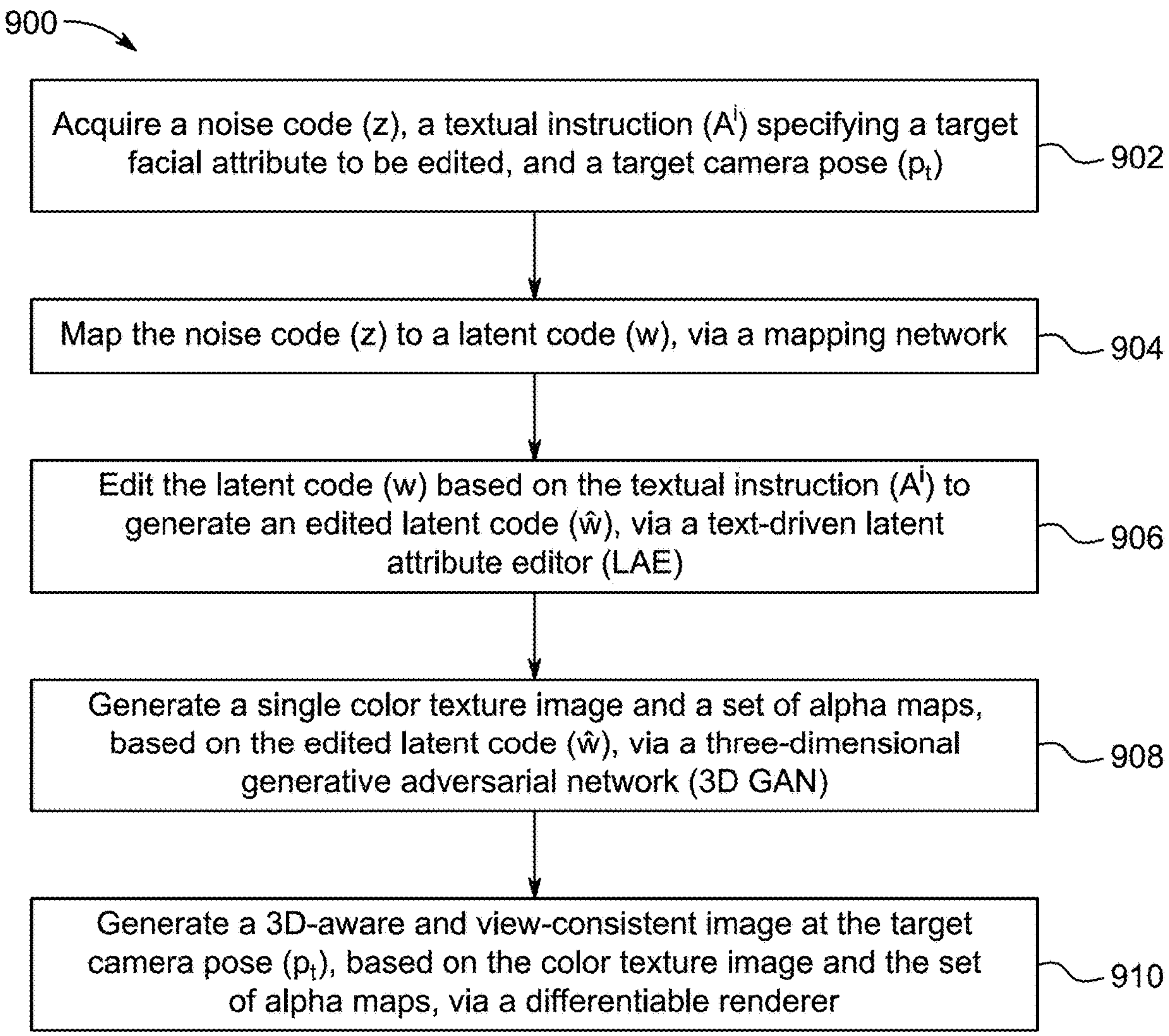
FIG. 9 is an exemplary diagram of a method for performing image editing based on the attribute-specific text prompt, according to certain embodiments.

Referring now to FIG. 9, the present disclosure provides an exemplary diagram 900 of a method of performing image editing based on the attribute-specific text prompt, according to certain embodiments. In order to perform the image editing based on the attribute-specific text prompt, initially at step 902, the noise code (z), the textual instruction ($A^i$) specifying the target facial attribute to be edited, and the target camera pose ($p_t$) are acquired. In an embodiment, the noise code (z) is acquired using the mapping network. In an embodiment, the noise code (z) is acquired from the random distribution (e.g., the Gaussian distribution or the uniform distribution). The noise code (z) is the random vector that serves as the input to the generative model, e.g., the 3D-GAN (also referred to as the 3D generation model). The textual instruction ($A^i$) specifying the target facial attribute to be edited may be for example, 'make the smile wider', 'change hair color', 'change age', and the like. In addition, the target facial attribute to be edited include, but is not limited to, the age, the makeup, the hair color, the hair style, the pupil color, the skin tone, and the facial emotional state.

Further, at step 904, the noise code (z) is mapped to the latent code (w) via the mapping network. Examples of the mapping network may include, but are not limited to, a pretrained network for obtaining a latent code from an input random latent vector, and the like. In an embodiment, the latent code (w) is the transformed version of the noise code (z) that is mapped into the more structured and meaningful space. In particular, the latent code (w) is the lower-dimensional representation that the 3D GAN uses for image generation and manipulation.

Upon mapping, at step 906, the latent code (w) is edited based on the textual instruction ($A^i$) to generate the edited latent code (w) via the text-driven LAE. In an embodiment, the text-driven LAE includes the set of learnable style tokens ($V_i$), the text encoder, and the style mapper. In an embodiment, each learnable style token corresponds to the editable facial attribute. The text encoder is configured to generate the textual embedding (Δv) representing the style corresponding to the target facial attribute, based on the textual instruction ($A^i$). In order to generate the textual embedding (Δv), the text encoder is configured to concatenate the textual instruction ($A^i$), the set of learnable style tokens ($V_i$), and the system prompt (t) to obtain the general prompt ($P^i_A$). Further, the text encoder is configured to encode the general prompt ($P^i_A$) to the textual embedding (Δv). In an embodiment, the text encoder is the CLIP text encoder. Further, the style mapper configured to generate the edited latent code ($\hat{w}$) based on the textual embedding (Δv). In an embodiment, to generate the edited latent code ($\hat{w}$), the style mapper is further configured to map the textual embedding (Δv) to the editing direction (Δw) in the latent space of the 3D GAN. Further, based on the editing direction (Δw) and the latent code (w), the style mapper is configured to generate the edited latent code ($\hat{w}$). In an embodiment, the style mapper includes the linear mapper configured to apply linear mapping to transform the textual embedding (Δv) into the editing direction (Δw) in the latent space. In an embodiment, the latent code (w) is divided into three groups, i.e., the group with coarse features ($w_c$), the group with middle features ($w_m$), and the group with fine features ($w_f$). The linear mapper includes the three sub-networks used for the three groups, respectively.

Once the edited latent code ($\hat{w}$) is generated, at step 908, the color texture image and the set of alpha maps are generated based on the edited latent code ($\hat{w}$) via the 3D GAN. In an embodiment, the 3D GAN may be the GMPI StyleGANversion2 with the alpha branch. In an embodiment, the color texture image is the 2D image that represents the visual appearance of the 3D object (e.g., the human face) from the specific viewpoint, i.e., the camera pose or the camera angle. In particular, the color texture image is the 2D image that represents the surface colors (e.g., skin tone, eye color, hair color) of the 3D object (e.g., the human face). The surface colors are applied based on the edited latent code ($\hat{w}$). Further, the set of alpha maps are additional 2D images that store information about the opacity (i.e., transparency) of the 3D object (i.e., the human face) at different points. The set of alpha maps is crucial for ensuring that the 3D object is rendered correctly in the 3D-aware manner.

Upon generating the color texture image and the set of alpha maps, at step 910, the 3D-aware and view-consistent image is generated at the target camera pose ($p_t$) based on the color texture image and the set of alpha maps using the differentiable renderer. In an embodiment, the differential renderer is configured to automatically compute the target camera pose ($p_t$) from data, like the sensor readings, the optimization, or the 3D reconstruction. In some embodiments, the target camera pose ($p_t$) is manually provided by the user. The target camera pose ($p_t$) refers to the specific position and the orientation of the camera (i.e., the camera associated with the computing device 102) in the 3D space, which determines the camera viewpoint from which the object (or a scene) is viewed or rendered. The 3D-aware and view-consistent image reflects the 3D structure (e.g., textures, geometry, lighting, depth) of the object and is consistent with the way the object should appear from the target camera pose ($p_t$), taking perspective, occlusions, and transparency into account.

In an embodiment, the present disclosure presents a method and a system (e.g., the system 100) designed to perform the image editing based on the attribute-specific text prompt. The method disclosed in the present disclosure is both data-free and highly efficient to train, enabling on-the-fly editing of arbitrary new attributes due to its language-driven approach. By leveraging a single set of style mappers and adding more learnable style tokens, the disclosed method allows the editing of a wide range of attributes. This makes the disclosed method efficient for handling novel attributes defined through textual instruction ($A^t$) (also referred to as the text prompts), distinguishing the disclosed method from other existing methods. Notably, the disclosed method requires minimum training time (e.g., 4 to 8 minutes of training time) to learn new attributes, depicting a significant improvement over existing techniques, which necessitates several hours of training and a pre-trained attribute-specific classifier.

Furthermore, despite employing a language encoder (i.e., the CLIP text encoder), the disclosed method achieves comparable inference times to the existing techniques, due to the fixed nature of the text prompts post-training, which enables efficient reuse of precomputed features. The disclosed method includes a style mapper sharing mechanism, allowing the same style mapper to be used across multiple attributes, which reduces both storage and computation requirements. The disclosed method efficiently edits 3D-aware and view-consistent facial image attributes specified through the text prompts. The disclosed method combines the text-driven LAE with the 3D GAN, where the text-driven LAE integrates learned style tokens and the style mapper, utilizing a pre-trained CLIP model to find appropriate editing directions within the latent space of the 3D GAN. This text-driven LAE, along with the use of learnable style tokens, allows efficient handling of novel editing directions. The effectiveness of the disclosed method is validated through a comprehensive set of qualitative and quantitative experiments, demonstrating its superior performance in both attribute editing and 3D generation.

Figure 10:
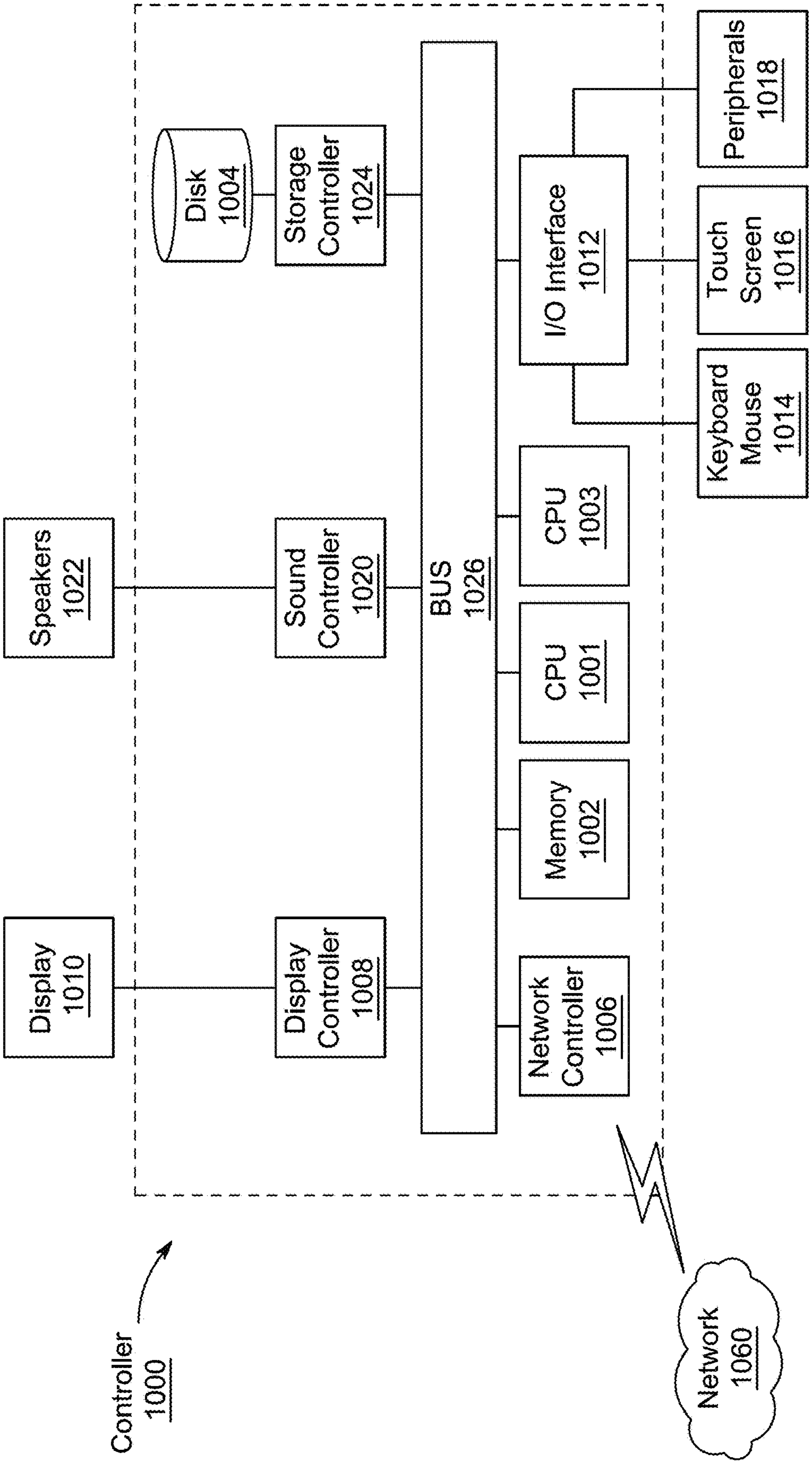
FIG. 10 is an illustration of a non-limiting example of details of computing hardware used in the computing device, according to certain embodiments.

Next, further details of the hardware description of the computing environment according to exemplary embodiments is described with reference to FIG. 10. In FIG. 10, a controller 1000 is described as representative of the system 100 of FIG. 1 in which the controller 1000 is a computing device which includes a CPU 1001 which performs the processes described above/below. The process data and instructions may be stored in a memory 1002. These processes and instructions may also be stored on a storage medium disk 1004 such as a Hard Disk Drive (HDD) or a portable storage medium or may be stored remotely.

Further, the claims are not limited by the form of the computer-readable media on which the instructions of the inventive process are stored. For example, the instructions may be stored on Compact Disks (CDs), Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the claims may be provided as a utility application, background daemon, or component of an operating system, or combination thereof, executing in conjunction with the CPU 1001, a CPU 1003 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 1001 or the CPU 1003 may be a Xenon or a Core processor from Intel of America or an Opteron processor from Advanced Micro Devices (AMD) of America, or may be other processor types that would be recognized by one of ordinary skill in the art. Alternatively, the CPU 1001, the CPU 1003 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 1001, the CPU 1003 may be implemented as multiple processors cooperatively working in parallel to perform the instructions of the inventive processes described above.

The computing device in FIG. 10 also includes a network controller 1006, such as an Intel Ethernet Professional (PRO) network interface card from an Intel Corporation of America, for interfacing with a network 1060. As can be appreciated, the network 1060 can be a public network, such as the Internet, or a private network such as a LAN or a WAN, or any combination thereof and can also include a PSTN or an Integrated Services Digital Network (ISDN) sub-networks. The network 1060 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 1008, such as a NVIDIA GeForce Giga Texel Shader eXtreme (GTX) or a Quadro graphics adaptor from a NVIDIA Corporation of America for interfacing with a display 1010, such as a Hewlett Packard HPL2445w Liquid Crystal Display (LCD) monitor. A general purpose I/O interface 1012 interfaces with a keyboard and/or mouse 1014 as well as a touch screen panel 1016 on or separate from display 1010. The general purpose I/O interface 1012 also connects to a variety of peripherals 1018 including printers and scanners, such as an OfficeJet or DeskJet from HP.

A sound controller 1020 is also provided in the computing device such as a Sound Blaster X-Fi Titanium from Creative, to interface with speakers/microphone 1022 thereby providing sounds and/or music.

A general purpose storage controller 1024 connects the storage medium disk 1004 with a communication bus 1026, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 1010, keyboard and/or mouse 1014, as well as the display controller 1008, the general purpose storage controller 1024, the network controller 1006, the sound controller 1020, and the general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 11.

Figure 11:
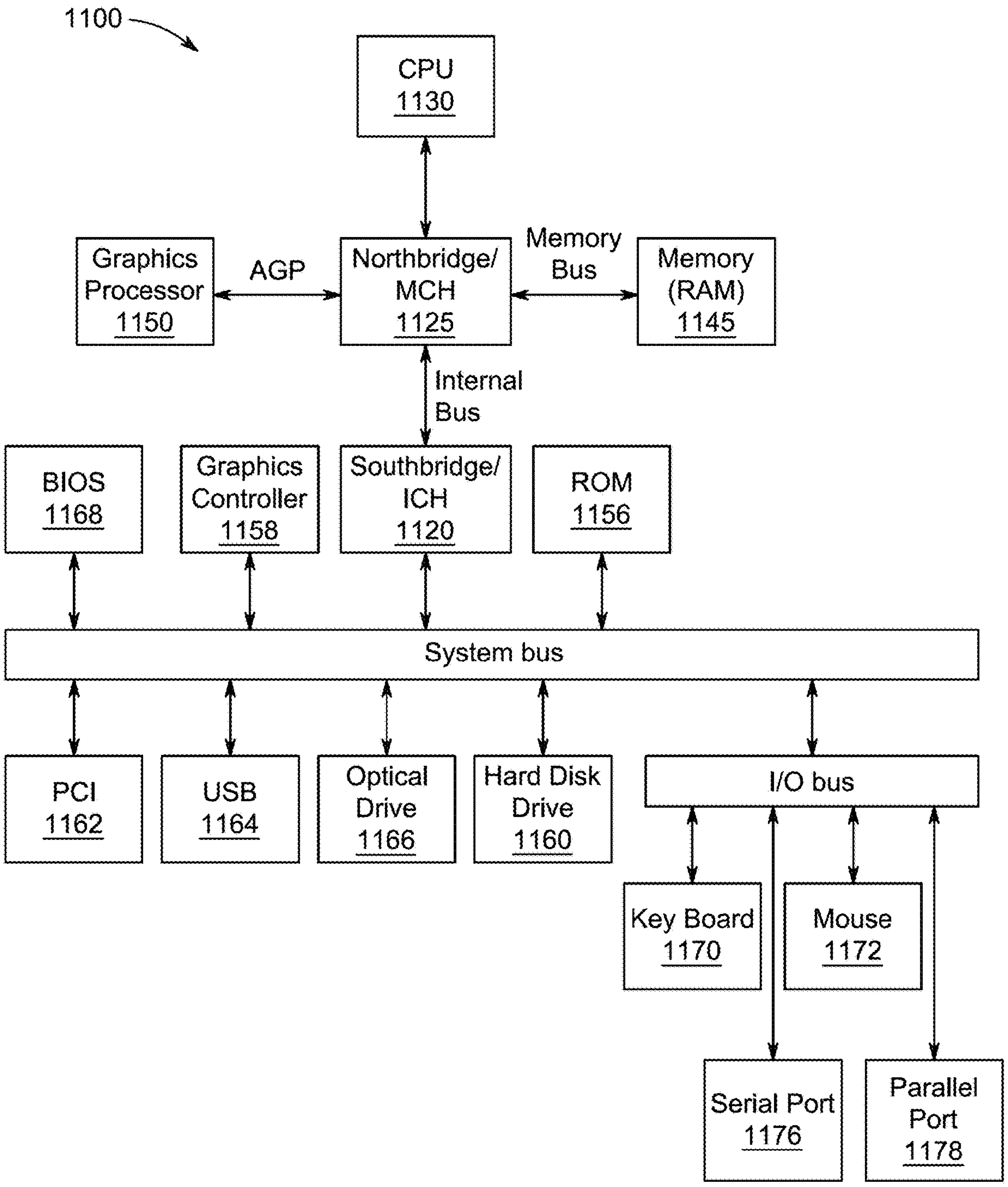
FIG. 11 is an exemplary schematic diagram of a data processing system used within the computing device, according to certain embodiments.

FIG. 11 shows a schematic diagram of a data processing system 1100, according to certain embodiments, for performing the functions of the exemplary embodiments. The data processing system 1100 is an example of a computer in which code or instructions implementing the processes of the illustrative embodiments may be located.

In FIG. 11, the data processing system 1100 employs a hub architecture including a North Bridge and a Memory Controller Hub (NB/MCH) 1125 and a south bridge and an I/O Controller Hub (SB/ICH) 1120. The CPU 1130 is connected to the NB/MCH 1125. The NB/MCH 1125 also connects to a memory 1145 via a memory bus and connects to a graphics processor 1150 via an Accelerated Graphics Port (AGP). The NB/MCH 1125 also connects to the SB/ICH 1120 via an internal bus (e.g., a unified media interface or a direct media interface). The CPU 1130 may contain one or more processors and even may be implemented using one or more heterogeneous processor systems.

Figure 12:
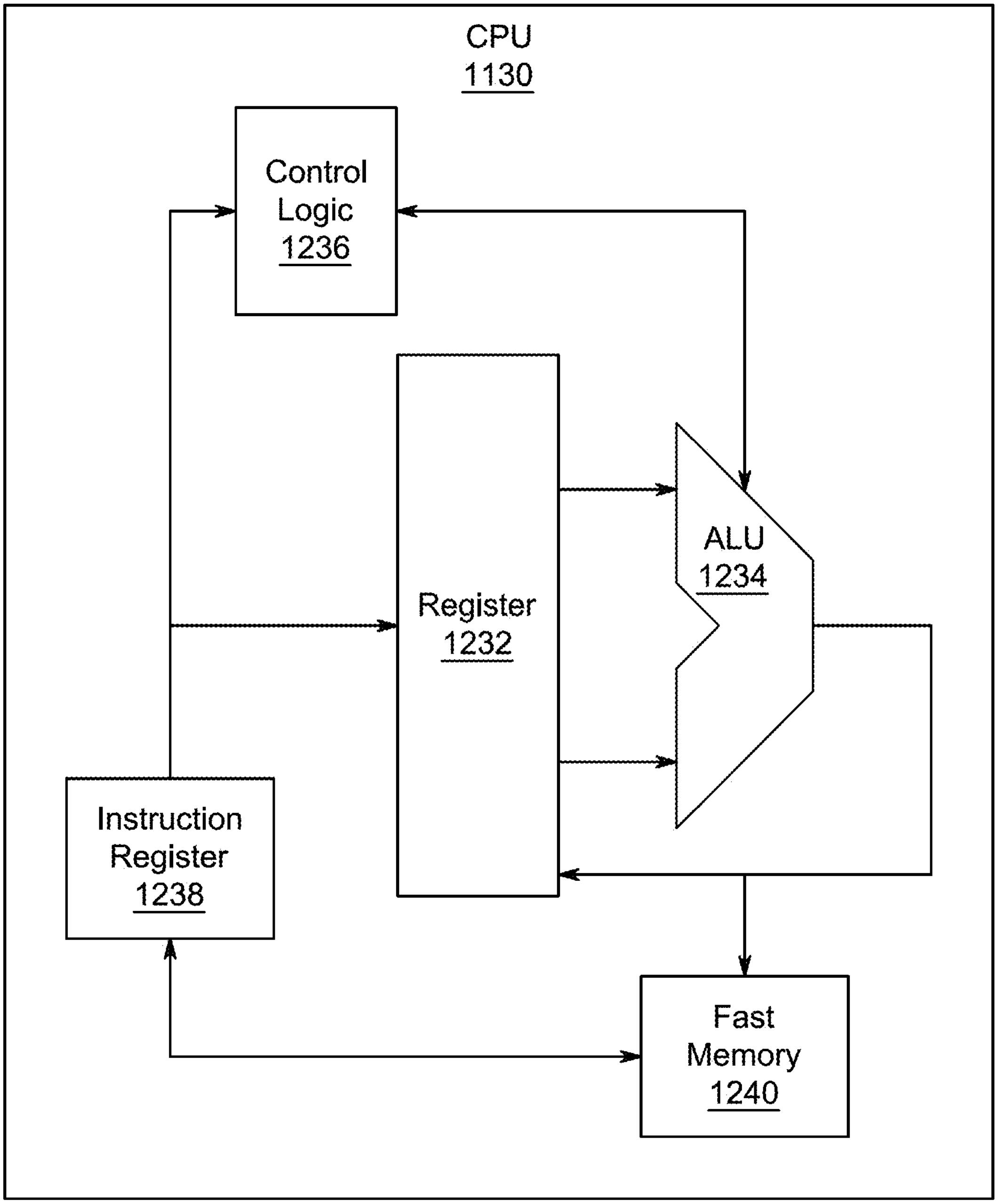
FIG. 12 is an exemplary schematic diagram of a processor used with the computing device, according to certain embodiments.

For example, FIG. 12 shows one implementation of the CPU 1130. In one implementation, an instruction register 1238 retrieves instructions from a fast memory 1240. At least part of these instructions is fetched from the instruction register 1238 by a control logic 1236 and interpreted according to the instruction set architecture of the CPU 1130. Part of the instructions can also be directed to a register 1232. In one implementation, the instructions are decoded according to a hardwired method, and in another implementation, the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1234 that loads values from the register 1232 and performs logical and mathematical operations on the loaded values according to the instructions. The results from these operations can be feedback into the register 1232 and/or stored in the fast memory 1240. According to certain implementations, the instruction set architecture of the CPU 1130 can use a reduced instruction set architecture, a complex instruction set architecture, a vector processor architecture, a very large instruction word architecture. Furthermore, the CPU 1130 can be based on a Von Neuman model or a Harvard model. The CPU 1130 can be a digital signal processor, an FPGA, an ASIC, a Programmable Logic Array (PLA), a PLD, or a Complex Programmable Logic Device (CPLD). Further, the CPU 1130 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 11, the data processing system 1100 can include that the SB/ICH 1120 is coupled through a system bus to an I/O Bus, a ROM 1156, a Universal Serial Bus (USB) port 1164, a flash Binary Input/Output System (BIOS) 1168, and a graphics controller 1158. PCI/PCIe devices can also be coupled to SB/ICH 888 through a PCI bus 1162.

The PCI devices may include, for example, Ethernet adapters, add-in cards, and Personal Computer (PC) cards for notebook computers. The HDD 1160 and an optical drive 1166 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1160 and the optical drive 1166 can also be coupled to the SB/ICH 1120 through a system bus. In one implementation, a keyboard 1170, a mouse 1172, a serial port 1176, and a parallel port 1178 can be connected to the system bus through the I/O bus. Other peripherals and devices that can be connected to the SB/ICH 1120 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 13:
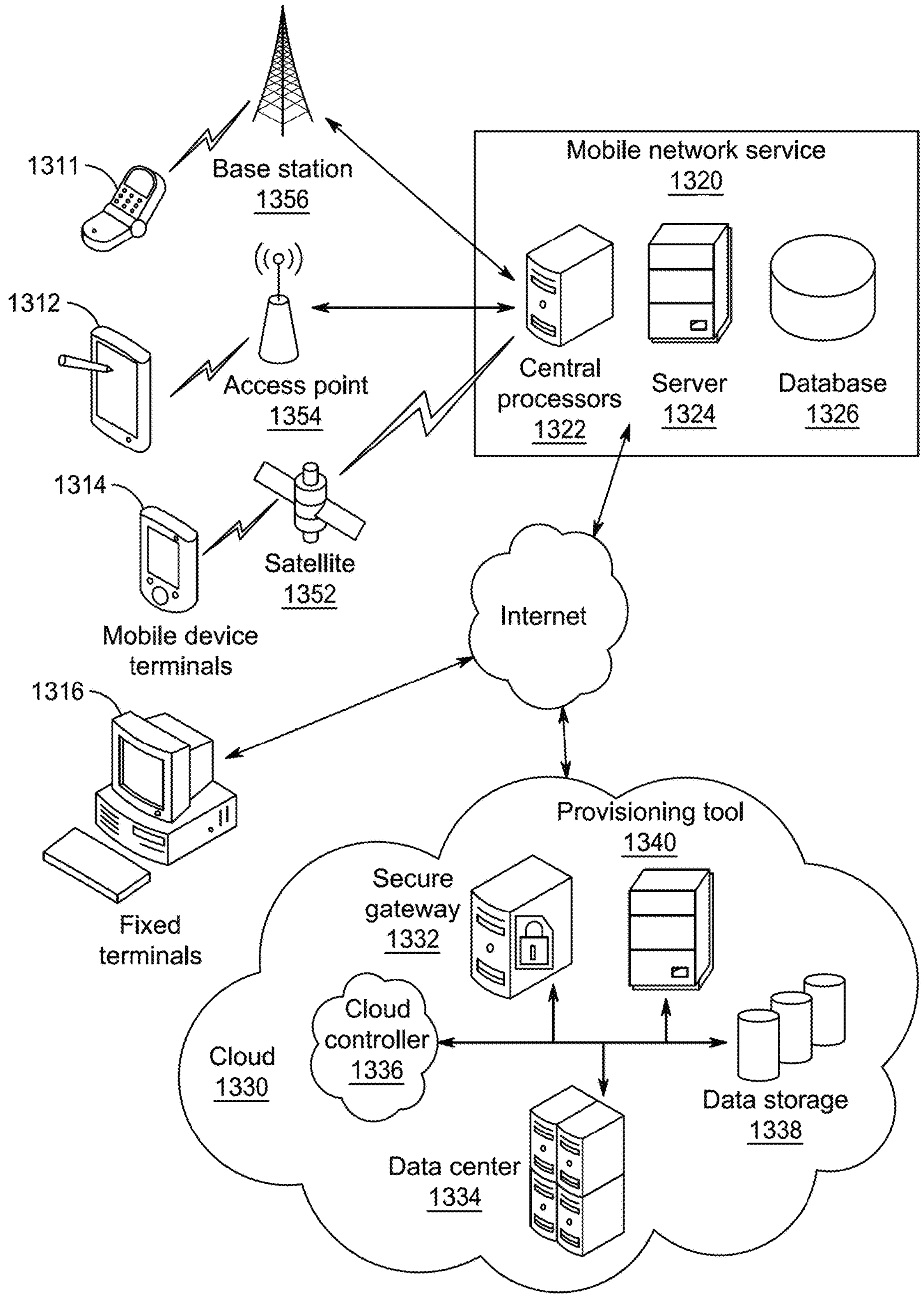
FIG. 13 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). More specifically, FIG. 13 illustrates client devices including a smart phone 1311, a tablet 1312, a mobile device terminal 1314 and fixed terminals 1316. These client devices may be commutatively coupled with a mobile network service 1320 via a base station 1356, an access point 1354, a satellite 1352 or via an internet connection. The mobile network service 1320 may comprise central processors 1322, a server 1324 and a database 1326. The fixed terminals 1316 and the mobile network service 1320 may be commutatively coupled via an internet connection to functions in cloud 1330 that may comprise a security gateway 1332, a data center 1334, a cloud controller 1336, a data storage 1338 and a provisioning tool 1340. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is, therefore, to be understood that the invention may be practiced otherwise than as specifically described herein.

The invention claimed is:

1. A system for performing image editing based on an attribute-specific text prompt, the system comprising:
   a memory for storing instructions; and
   processing circuitry configured to execute the instructions to implement:
      a mapping network,
      a text-driven Latent Attribute Editor (LAE),
      a three-dimensional Generative Adversarial Network (3D GAN),
      a differentiable renderer, wherein
   the mapping network is configured to acquire a noise code (z) and map the noise code (z) to a latent code (w),
   the text-driven LAE is configured to acquire a textual instruction ($A^i$) specifying a target facial attribute to be edited, and edit the latent code (w) based on the textual instruction ($A^i$) to generate an edited latent code ($\hat{w}$),
   the 3D GAN is configured to generate a color texture image and a set of alpha maps, based on the edited latent code ($\hat{w}$),
   the differentiable renderer is configured to acquire a target camera pose ($p_t$), and generate a 3D-aware and view-consistent image at the target camera pose ($p_t$), based on the color texture image and the set of alpha maps,
   the text-driven LAE includes:
      a set of learnable style tokens ($V_i$), each learnable style token corresponding to an editable facial attribute,
      a text encoder configured to generate a textual embedding (Δv) representing a style corresponding to the target facial attribute, based on the textual instruction (Ai), and
      a style mapper configured to generate the edited latent code (w) based on the textual embedding (Δv), and
   the text encoder is further configured to:
      concatenate the textual instruction ($A^i$), the set of learnable style tokens ($V_i$), and a system prompt (t) to obtain a general prompt ($P^i_A$), and
      encode the general prompt ($P^i_A$) to the textual embedding (Δv).

2. The system of claim 1, wherein the text encoder is a Contrastive Language-Image Pretraining (CLIP) text encoder.

3. The system of claim 1, wherein the style mapper is further configured to:
   map the textual embedding (Δv) to an editing direction (Δw) in a latent space of the 3D GAN, and
   based on the editing direction (Δw) and the latent code (w), generate the edited latent code ($\hat{w}$).

4. The system of claim 3, wherein the style mapper includes a linear mapper configured to apply linear mapping to transform the textual embedding (Δv) into the editing direction (Δw) in the latent space.

5. The system of claim 4, wherein the latent code (w) is divided into three groups: a group with coarse features ($w_c$), a group with middle features ($w_m$), and a group with fine features ($w_f$), and the linear mapper includes three sub-networks used for the three groups, respectively.

6. The system of claim 1, wherein the 3D-GAN is a Generative Multiplane Image (GMPI) StyleGANversion2 with an alpha branch.

7. The system of claim 1, wherein the system is end-to-end trained using a loss function that has a text-prompt-based attribute editing loss term ($L_T$) and a 3D-aware identity and pose preservation term ($L_P$).

8. The system of claim 7, wherein the text-prompt-based attribute editing loss term ($L_T$) includes a directional CLIP loss term ($L_{Dclip}$) and a style token contrastive learning loss term ($L_{sc}$).

9. The system of claim 7, wherein the 3D-aware identity and pose preservation term ($L_P$) includes an identity preservation loss term ($L_{id}$), an identity consistency preservation loss term ($L_{idvc}$), a camera pose preservation loss term ($L_{latent}$), and an alpha-map consistency preservation loss term ($L_\alpha$).

10. The system of claim 1, wherein the target facial attribute to be edited includes an age, a makeup, a hair color, a hair style, a pupil color, a skin tone, and a facial emotional state.

11. A method for performing image editing based on an attribute-specific text prompt, comprising:
   acquiring a noise code (z), a textual instruction ($A^i$) specifying a target facial attribute to be edited, and a target camera pose ($p_t$);
   mapping the noise code (z) to a latent code (w), via a mapping network;
   editing the latent code (w) based on the textual instruction ($A^i$) to generate an edited latent code ($\hat{w}$), via a text-driven Latent Attribute Editor (LAE);
   generating a color texture image and a set of alpha maps, based on the edited latent code ($\hat{w}$), via a three-dimensional Generative Adversarial Network (3D GAN); and
   generating a 3D-aware and view-consistent image at the target camera pose ($p_t$), based on the color texture image and the set of alpha maps, via a differentiable renderer,
   wherein the text-driven LAE includes:
      a set of learnable style tokens ($V_i$), each learnable style token corresponding to an editable facial attribute,
      a text encoder configured to generate a textual embedding (Δv) representing a style corresponding to the target facial attribute, based on the textual instruction ($A^i$), and
      a style mapper configured to generate the edited latent code ($\hat{w}$) based on the textual embedding (Δv), and
   wherein the text encoder is further configured to:
      concatenate the textual instruction ($A^i$), the set of learnable style tokens ($V_i$), and a system prompt (t) to obtain a general prompt ($P^i_A$), and
      encode the general prompt ($P^i_A$) to the textual embedding (Δv).

12. The method of claim 11, wherein the text encoder is a Contrastive Language-Image Pretraining (CLIP) text encoder.

13. The method of claim 11, wherein the style mapper is further configured to:
   map the textual embedding (Δv) to an editing direction (Δw) in a latent space of the 3D GAN, and
   based on the editing direction (Δw) and the latent code (w), generate the edited latent code ($\hat{w}$).

14. The method of claim 13, wherein the style mapper includes a linear mapper configured to apply linear mapping to transform the textual embedding (Δv) into the editing direction (Δw) in the latent space.

15. The method of claim 14, wherein the latent code (w) is divided into three groups: a group with coarse features ($w_c$), a group with middle features ($w_m$), and a group with fine features ($w_f$), and the linear mapper include three sub-networks used for the three groups, respectively.

16. The method of claim 11, wherein the 3D-GAN is a Generative Multiplane Image (GMPI) StyleGANversion2 with an alpha branch.

* * * * *